(12) United States Patent
Richardson

(10) Patent No.: US 8,331,965 B2
(45) Date of Patent: Dec. 11, 2012

(54) METHODS AND APPARATUS FOR CONTROLLING RESOURCE USE IN A WIRELESS COMMUNICATIONS SYSTEM

(75) Inventor: Thomas Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 390 days.

(21) Appl. No.: 12/483,335

(22) Filed: Jun. 12, 2009

(65) Prior Publication Data

US 2010/0317291 A1  Dec. 16, 2010

(51) Int. Cl.
*H04B 15/00* (2006.01)
*H04B 1/00* (2006.01)
*H04B 17/00* (2006.01)

(52) U.S. Cl. ............ 455/501; 455/63.1; 455/67.13

(58) Field of Classification Search ............ 455/500, 455/501, 507, 63.1, 67.11, 67.13, 69, 296
See application file for complete search history.

(56) References Cited

U.S. PATENT DOCUMENTS

| | | | | |
|---|---|---|---|---|
| 4,056,788 | A * | 11/1977 | Brown et al. | 331/78 |
| 5,887,034 | A * | 3/1999 | Suzuki | 375/285 |
| 6,587,460 | B1 * | 7/2003 | Bell et al. | 370/385 |
| 6,952,589 | B1 * | 10/2005 | Mantha | 455/501 |
| 7,424,268 | B2 * | 9/2008 | Diener et al. | 455/62 |
| 7,437,166 | B2 * | 10/2008 | Osseiran et al. | 455/452.1 |
| 8,107,909 | B2 * | 1/2012 | Okino et al. | 455/226.3 |
| 2005/0170776 | A1 * | 8/2005 | Siorpaes | 455/41.2 |
| 2006/0245448 | A1 | 11/2006 | Chan et al. | |
| 2007/0042784 | A1 * | 2/2007 | Anderson | 455/450 |
| 2007/0173198 | A1 * | 7/2007 | Kim et al. | 455/63.1 |

OTHER PUBLICATIONS

Baowei Ji., "Asynchronous busy-tone multiple access with acknowledgement (ABTMA/ACK) for ad hoc wireless networks" Global Telecommunications Conference, 2005. Globecom '05. IEEE St. Loius, MO, USA Nov. 28-Dec. 2, 2005, Piscataway, NJ, USA, IEEE LNKD-DOI: 10.1109/GLOCOM. 2005.1578451, vol. 6, Nov. 28, 2005, pp. 3643-3647, XP010881784.
Shiang-Rung Ye, et al., "A jamming-based MAC protocol for wireless multihop ad hoc networks" Vehicular Technology Conference, 2003. VTC 2003-Fall. 2003 IEEE 58th Orlando, FL, USA Oct. 6-9, 2003; [IEEE Vehicular Technolgy Conference], Piscataway, NJ, USA,IEEE, US LNKD-DOI: 10.1109/VETECF. 2003.1285254, vol. 3, Oct. 6, 2003, pp. 1396-1400, XP010701206.

(Continued)

*Primary Examiner* — Andrew Wendell
(74) *Attorney, Agent, or Firm* — James O'Hare; Paul S. Holdaway

(57) ABSTRACT

Methods and apparatus for detecting, controlling and/or mitigating interference are described. Various embodiments are well suited to wireless communications systems in which shared communications resources are used, e.g., in a peer to peer communications systems lacking centralized control. In some embodiments, a communications device receives signals on shared communications resource, evaluates its capability to decode a received signal, and conditionally transmits an interference signal, e.g., on the shared communications resource. The interference signal is intended to cause a device transmitting on the shared communications resource to switch to a different communications resource, e.g., in response to the interference signal, so that its transmitted signal can be successfully decoded. In at least one embodiment, the shared communications resource is a peer discovery air link resource associated with a peer discovery resource identifier.

17 Claims, 16 Drawing Sheets

OTHER PUBLICATIONS

Tyrrell A, et al., "Decentralized Interference Aware Link Adaptation Using Busy Bursts" Proceedings of the 2007 [IEEE International Conference on Communications (ICC 2007), Jun. 24-28, 2007, Glasgow, UK, IEEE, Piscataway, NJ, USA, Jun. 1, 2007, pp. 3213-3217, XP031126166.

Yan L I, et al., "Co-channel interference avoidance algorithm in 802.11 wireless LANs" Vehicular Technology Conference, 2003. VTC 2003-Fall. 2003 IEEE 58TH Orlando, FL, USA Oct. 6-9, 2003; [IEEE Vehicular Technolgy Conference], Piscataway, NJ, USA, IEEE, US LNKD-DOI: 10.1109/VETECF. 2003.1286020, vol. 4, Oct. 6, 2003, pp. 2610-2614, XP010702771.

Yang Y, et al., "Modeling the Effect of Transmit Power and Physical Carrier Sense in Multi-Hop Wireless Networks" INFOCOM 2007. 26th IEEE International Conference on Computer Communica Tions. IEEE, IEEE, PI LNKDDOI: 10.1109/INFCOM.2007.275, May 1, 2007, pp. 2331-2335, XP031093811.

International Search Report and Written Opinion—PCT/US2010/038347, International Search Authority—European Patent Office—Oct. 15, 2010.

\* cited by examiner

METHODS AND APPARATUS FOR CONTROLLING RESOURCE USE IN A WIRELESS COMMUNICATIONS SYSTEM

FIELD

Various embodiments relate to wireless communications, and more particularly, to methods and apparatus which can be used for controlling resource use in a system, e.g., a system using shared resources.

BACKGROUND

In many conventional cellular wireless communications networks, transmission power over a plurality of wireless links is controlled in a centralized manner. For example, a base station or central controller device may coordinate communications corresponding to a plurality of mobiles which are using the base station as a point of network attachment in the communications system. The base station and/or central controller manages resource allocation and communications corresponding to a plurality of mobiles competing for the limited air link resources, e.g., granting or denying access, assigning air link resources to mobiles, tracking mobile position, measuring communications channels, controlling transmission power levels, controlling data rates, and/or managing interference. The base station and/or centralized control device can, and generally does, perform closed loop power and timing control operations as part of the management and control of mobile transmissions. The base station's antenna is generally situated such as to provide good channel conditions between the base station and mobiles. The base station and/or centralized controller has a good overall view of the situation in a cell, and it can effectively manage communications corresponding to a plurality of different links between mobiles and the base station, e.g., preventing unacceptable levels of interference on the air link resources due to concurrent transmissions from two mobiles.

In the field of wireless communications there has been a trend to make spectrum available for use by various types of networks in addition to conventional cellular networks. One such network type which has been gaining in popularity and utilization is a peer to peer network, e.g., peer to peer networks lacking centralized control. It is desirable that a peer to peer network be able to support reliable communications over a wide range of distances. In a peer to peer network, lacking centralized control and/or management, a particular wireless communications device may have an incomplete view of the ongoing operations of other devices in its vicinity. For example, due to poor channel conditions between two devices, the two devices may be hidden from one another. Such a condition, sometimes referred to as a hidden node condition, may be caused by an object such as a building obstructing, and thereby blocking one node's transmission path to the other node. In such a situation two wireless communications devices may inadvertently transmit on the same air link resource. Signals from the two devices transmitting concurrently on the same air link resource may interfere with each other such that other devices in the local vicinity, which have good channel conditions to both devices, e.g., because of an unobstructed transmission path to both devices, are unable to decode either transmitted signal. Based on the above discussion there is a need for new methods and apparatus that can detect unacceptable interference due to a hidden node condition and/or take actions to remedy the unacceptable condition.

SUMMARY

Methods and apparatus for detecting, controlling and/or mitigating interference are described. Various embodiments are well suited to wireless communications systems in which shared communications resources are used, e.g., peer to peer communications systems lacking centralized control where resources, e.g., frequency-time transmission units, are shared. In some embodiments, a communications device receives signals on shared communications resource and evaluates its capability to decode a received signal. Based on the results of the evaluation, the communications device may, and sometimes does, transmit an interference signal, e.g., on the shared communications resource. The interference signal is intended to cause a device transmitting on the shared communications resource to switch to a different communications resource. The triggering of the switch is with the expectation that after the switch the transmitting device's transmitted signal will be capable of successfully being decoded. In at least one embodiment, the shared communications resource is a peer discovery air link resource associated with a peer discovery resource identifier.

An exemplary method of operating a first communications device, in some embodiments, comprises: receiving first and second signals from second and third communications devices, respectively, on a first shared communications resource being used by both said second and third communications devices; determining that signal quality of the first and second signals is insufficient for reliable decoding; and transmitting an interference signal on said first shared communications resource. An exemplary first communications device, in accordance with some embodiments, comprises: at least one processor configured to: receive first and second signals from second and third communications devices, respectively, on a first shared communications resource being used by both said second and third communications devices; determine that signal quality of the first and second signals is insufficient for reliable decoding; and transmit an interference signal on said first shared communications resource. The first communications device also includes memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
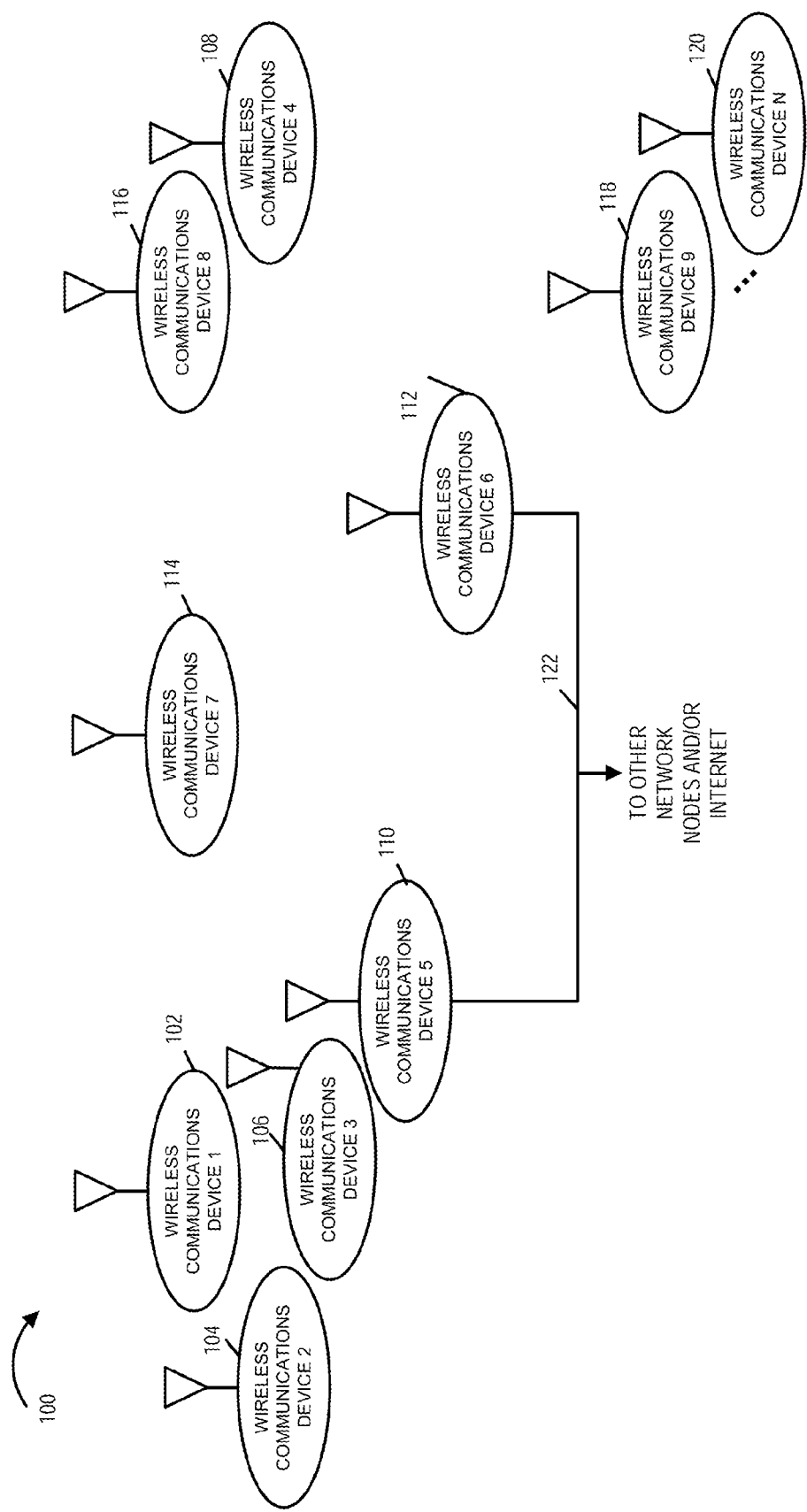
FIG. 1 is a drawing of an exemplary wireless communications system in accordance with an exemplary embodiment.

FIG. 1 is a drawing of an exemplary wireless communications system in accordance with an exemplary embodiment. Exemplary wireless communications system 100 includes a plurality of wireless communications devices (wireless communications device 1 102, wireless communications device 2 104, wireless communications device 3 106, wireless communications device 4 108, wireless communications device 5 110, wireless communications device 6 112, wireless communications device 7 114, wireless communications device 8 116, wireless communications device 9 118, . . . , wireless communications device N 120. Some of the wireless communications devices of system 100, e.g., device 5 110 and device 6 112, are coupled to other network nodes and/or the Internet, e.g., via backhaul network 122. Some of the wireless communications devices of system 100 are mobile devices, e.g., devices (102, 104, 106, 108, 114, 116, 118, 120).

The wireless communications devices (102, 104, 106, 108, 110, 112, 114, 116, 118, 120) support peer to peer communications and implement a peer to peer timing structure. The peer to peer communications system implements a decentralized approach to resource allocation. An individual wireless communications device makes a decision, based on its perspective, as to whether or not a resource can be used. For example, the third wireless communications device 106 selects a peer discovery resource identifier corresponding to a peer discovery air link resource that, from its perspective appears to be unoccupied by any other wireless communications devices in its local vicinity. Then, the third wireless communications device 106 transmits a peer discovery signal on the air link resource mapping to the selected identifier. However, due to poor channel conditions, the third wireless communications device 106 may have been unaware of a hidden node, e.g., second wireless communications device 104 in its vicinity that was already using the selected identifier but happened to have a poor channel with respect to the third wireless communications device 106. This can, and sometimes does, create a conflict for first wireless communications device 102 in the vicinity which may have good channel conditions to both the second and third wireless communications devices (104, 106).

Wireless communications devices monitor for hidden node conditions resulting in unacceptable levels of interference, generate and transmit intentional interference signals, e.g., intentional jamming signals. The intentional interference signals are used to cause a device to switch to a different air link resource. For example, the first communications device 102 detects interference caused by the second and third devices (104, 106) transmitting concurrently on a shared peer discovery air link resource, generates an intentional interference signal, transmits the generated interference signal, and causes at least one of the second and third devices (104, 106) to switch to a different peer discovery air link resource.

Figure 2A:
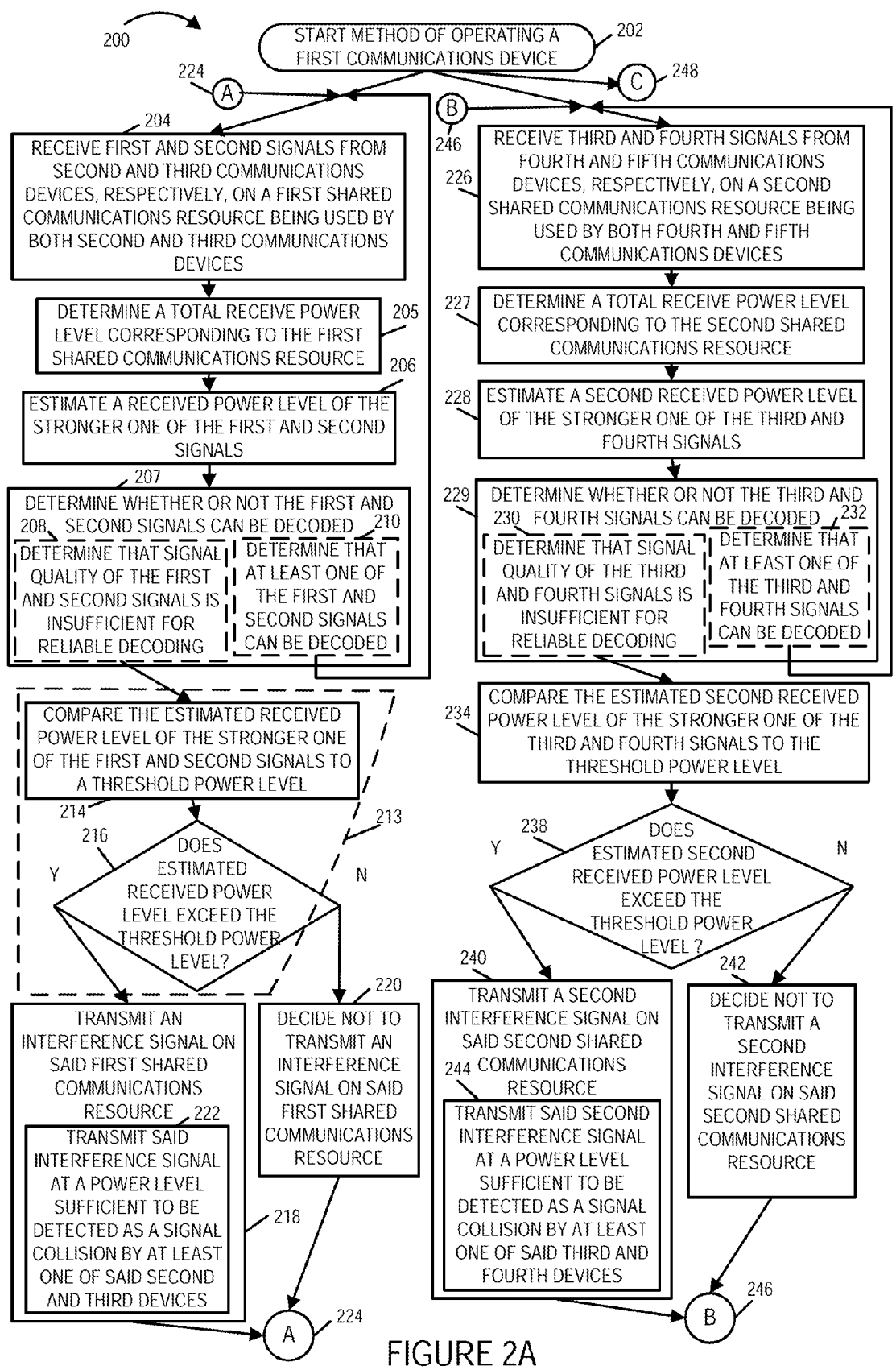
FIG. 2A is a first part of a flowchart of an exemplary method of operating a first communications device in accordance with an exemplary embodiment.
Figures 2, 2A, 2B:
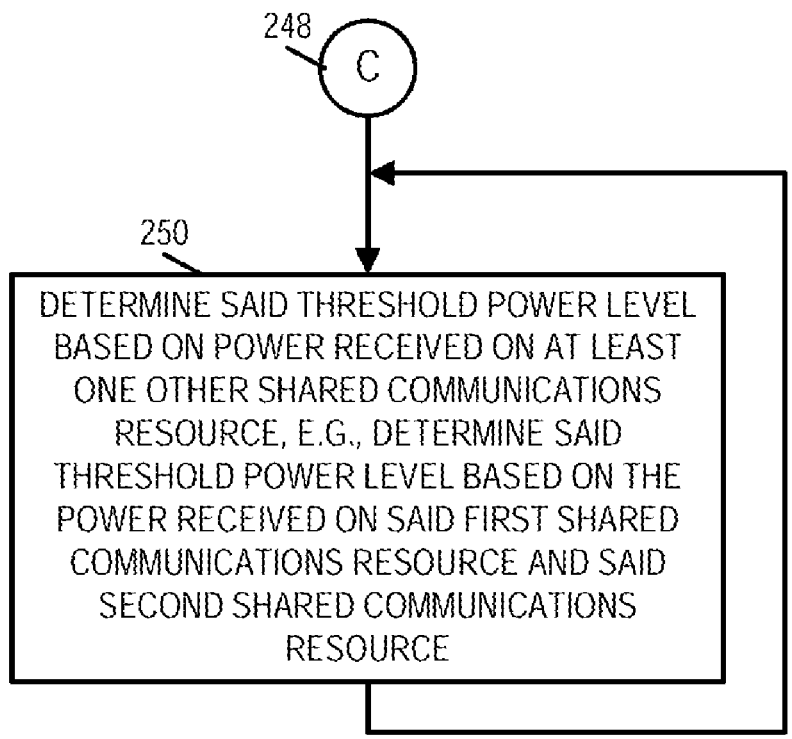
FIG. 2B is a second part of a flowchart of an exemplary method of operating a first communications device in accordance with an exemplary embodiment.

FIG. 2, comprising the combination of FIG. 2A and FIG. 2B, is a flowchart 200 of an exemplary method of operating a first communications device in accordance with an exemplary embodiment. Operation starts in step 202 where the first communications device is powered on and initialized and proceeds to step 204, step 226 and step 250 via connecting node C 248.

Returning to step 204, in step 204 the first communications device receives first and second signals from second and third communications devices, respectively, on a first shared communications resource being used by both second and third communications devices. In some embodiments, the first shared communications resource includes OFDM tone-symbols corresponding to multiple symbol time periods. In some embodiments, the first shared communications resource is a peer discovery device communications channel including said OFDM tone-symbols. Operation proceeds from step 204 to step 205.

In step 205 the first communications device determines a total receive power level corresponding to the first communications resource, e.g., $P_T(1)$, where 1 refers to the index corresponding to the first communications resource. In step 206 the first communications device estimates a received power level of the stronger one of the first and second signals, e.g., $P_S(1)$, where 1 refers to the index corresponding to the first communications resource. Operation proceeds from step 206 to step 207.

In step 207 the first communications device determines whether or not the first and second signals can be decoded. For example, the first communications device determines if the strongest received signal can not be decoded by checking if $(P_S(1)/(P_T(1)-P_S(1)))$ is less than $T_1$, where $T_1$ is a decoding threshold value. Step 207 includes steps 208 and step 210, one of which is performed for each iteration of step 207.

In step 208 the first communications device determines that signal quality of the first and second signals is insufficient for reliable decoding. In some but not all embodiments this involves determining that the first and second signals can not be decoded, e.g., with a reliability above a predetermined threshold. In one embodiment where reliability thresholds are not used, this involves simply determining that the signal quality of the first and second signals is insufficient to allow the first and second signals to be decoded. Operation proceeds from step 208 to step 214. In step 210 the first communications device determines that at least one of the first and second signals can be decoded. Operation proceeds from step 210 to the input of step 204.

In step 214 the first communications device compares the estimated received power level of the stronger one of the first and second signals to a threshold power level. For example, consider that the threshold power level is represented by: $(P^*)(T_2)$, where $P^*$ represents the energy level in a bin of a set of bins corresponding to total receive power levels for a plurality of communications resources of which the first shared communications resource is one member, and where $T_2$ is a threshold gain value. Further consider that in step 214 the first communications device compares $P_S(1)$ to $(P^*)(T_2)$. Operation proceeds from step 214 to step 216. In step 216 the first communications devices checks if the estimated received power level of step 206 exceeds the threshold power limit. For example, in step 214 the first communications device checks as to whether $P_S(1)$ is greater than $(P^*)(T_2)$. If the estimated received power level exceeds the threshold power level, then in step 216 the first communications device controls operation to proceed from step 216 to step 218. However, if the estimated received power level does not exceed the threshold power level, then the first communications device controls operation to proceed from step 216 to step 220. Dotted box 213 represents a step of determining that the estimated received power level exceeds a threshold power level.

In step 218 the first communications device transmits an interference signal on said first shared communications resource. Step 218 includes step 222 in which the first communications device transmits said interference signal at a power level sufficient to be detected as a signal collision by at least one of said second and third devices. Operation proceeds from step 218 to connecting node A 224. Returning to step 220, in step 220 the first communications device decides not to transmit an interference signal on said first shared communications resource. Operation proceeds from step 220 to connecting node A 224. Operation proceeds from connecting node A 224 to the input of step 204.

Returning to step 226, in step 226 the first communications device receives third and fourth signals from fourth and fifth communications devices, respectively, on a second shared communications resource being used by both fourth and fifth communications devices. In some embodiments, the second shared communications resource includes OFDM tone-symbols corresponding to multiple symbol time periods. In some embodiments, the second shared communications resource is a second peer discovery device communications channel including OFDM tone-symbols. Operation proceeds from step 226 to step 227. In step 227, the first communications device determines a total receive power level corresponding to the second shared communications resource, e.g., $P_T(2)$. Operation proceeds from step 227 to step 228. In step 228 the first communications device estimates a second received power level of the stronger one of the third and fourth signals, e.g., $P_S(2)$. Operation proceeds from step 228 to step 229.

In step 229 the first communications device determines whether or not the third and fourth signals can be decoded. For example, the first communications device determines if the strongest received signal of the shared second communications resource can not be decoded by checking if $(P_S(2)/(P_T(2)-P_S(2)))$ is less than $T_1$, where $T_1$ is the decoding threshold value. Step 229 includes steps 230 and step 232, one of which is performed for each iteration of step 229.

In step 230 the first communications device determines that signal quality of the third and fourth signals is insufficient for reliable decoding. Operation proceeds from step 230 to step 234. In step 232 the first communications device determines that at least one of the third and fourth signals can be decoded. Operation proceeds from step 232 to the input of step 226.

In step 234 the first communications device compares the estimated second received power level of the stronger one of the third and fourth signals to the threshold power level. For example, consider that in step 234 the first communications device compares $P_S(2)$ to $(P^*)(T_2)$. Operation proceeds from step 234 to step 238. In step 238 the first communications devices checks if the estimated second received power level of step 228 exceeds the threshold power limit. For example, in step 238 the first communications device checks as to whether $P_S(2)$ is greater than $(P^*)(T_2)$. If the estimated second received power level exceeds the threshold power level, then in step 238 the first communications device controls operation to proceed from step 238 to step 240. However, if the estimated second received power level does not exceed the threshold power level, then the first communications device controls operation to proceed from step 238 to step 242.

In step 240 the first communications device transmits a second interference signal on said second shared communications resource. Step 240 includes step 244 in which the first communications device transmits said second interference signal at a power level sufficient to be detected as a signal collision by at least one of said third and fourth devices. Operation proceeds from step 240 to connecting node B 246. Returning to step 242, in step 242 the first communications device decides not to transmit a second interference signal on said second shared communications resource. Operation proceeds from step 242 to connecting node B 246. Operation proceeds from connecting node B 246 to the input of step 226.

Returning to step 250, in step 250 the first communications device determines said threshold power level based on power received on at least one other shared communications resource in addition to the first shared communications resource. For example, the first communications device determines the threshold power level based on the power received in said first shared communications resources and said second shared communications resource. In one example, the threshold power level is $(P^*)(T_2)$. In various embodiments, $P^*$ changes based upon the environment. In various embodiments, the threshold power level is a function of observed power levels corresponding to a set of resources, e.g., a set of peer discovery resources which may be, and sometimes are shared communications resources. For example, $(P^*)(T_2)$=function $(P_T(1), P_T(2), \ldots, P_T(m))$, where there are m resources in the set. Step 250 is performed on an ongoing basis, e.g., with the threshold power level being changed dynamically.

Figure 3:
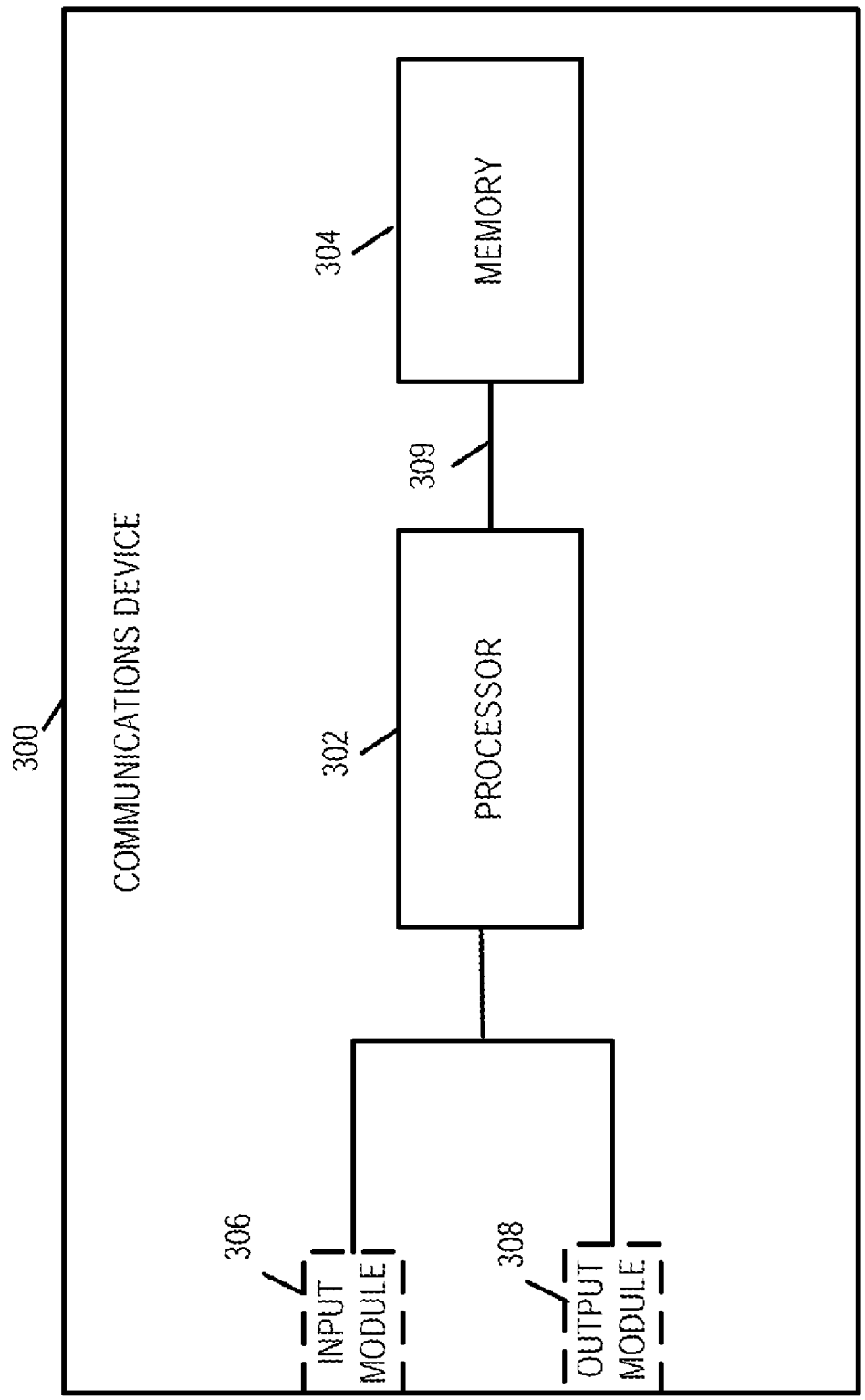
FIG. 3 is a drawing of an exemplary first communications device, in accordance with an exemplary embodiment.

FIG. 3 is a drawing of an exemplary first communications device 300, in accordance with an exemplary embodiment. Exemplary communications device 300 is, e.g., one of the wireless communications devices of FIG. 1. Exemplary communications device 300 may, and sometimes does, implement a method in accordance with flowchart 200 of FIG. 2.

Communications device 300 includes a processor 302 and memory 304 coupled together via a bus 309 over which the various elements (302, 304) may interchange data and information. Communications device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output.

Processor 302 is configured to: receive first and second signals from second and third communications devices, respectively, on a first shared communications resource being used by both said second and third communications devices; determine that signal quality of the first and second signals is insufficient for reliable decoding; and transmit an interference signal on said first shared communications resource. The first shared communications resource, in some embodiments, includes OFDM tone-symbols corresponding to multiple symbol time periods. In some such embodiments, the first shared communications resource is a peer discovery device communications channel including said OFDM tone-symbols.

Processor 302 is further configured to transmit said interference signal at a power level sufficient to be detected as a signal collision by at least one of said second and third devices, as part of being configured to transmit the interference signal.

Processor 302, in some embodiments, is further configured to: estimate a received power level of the stronger one of the first and second signals, prior to transmitting said interference signal; and determine that the estimated received power level exceeds a threshold power level, prior to transmitting said interference signal. Processor 302, in various embodiments, is further configured to: compare said estimated received power level to said threshold power level to determine if the estimated received power level exceeds said threshold power level, as part of being configured to determine that the estimated received power level exceeds a threshold power level.

Processor 302, in some embodiments, is further configured to: receive third and fourth signals from fourth and fifth communications devices, respectively, on a second shared communications resource being used by both said fourth and fifth communications devices; estimate a second received power level of the stronger one of the third and fourth signals; determine that signal quality of the third and fourth signals is insufficient for reliable decoding; compare the second estimated received power level to said threshold power level to determine if the second estimated received power level exceeds said threshold power level; and decide not to transmit a second interference signal on said second shared communications resource, upon determining that said second estimated received power level does not exceed said threshold power level. The second shared communications resource, in some embodiments, includes OFDM tone-symbols corresponding to multiple symbol time periods. In some such embodiments, the second shared communications resource is a peer discovery device communications channel including OFDM tone-symbols. In various embodiments, the first and second shared communications resources are non-overlapping resources.

In at least some embodiments, processor 302 is further configured to: determine said threshold power level based on power received on at least one other shared communications resource.

Figure 4:
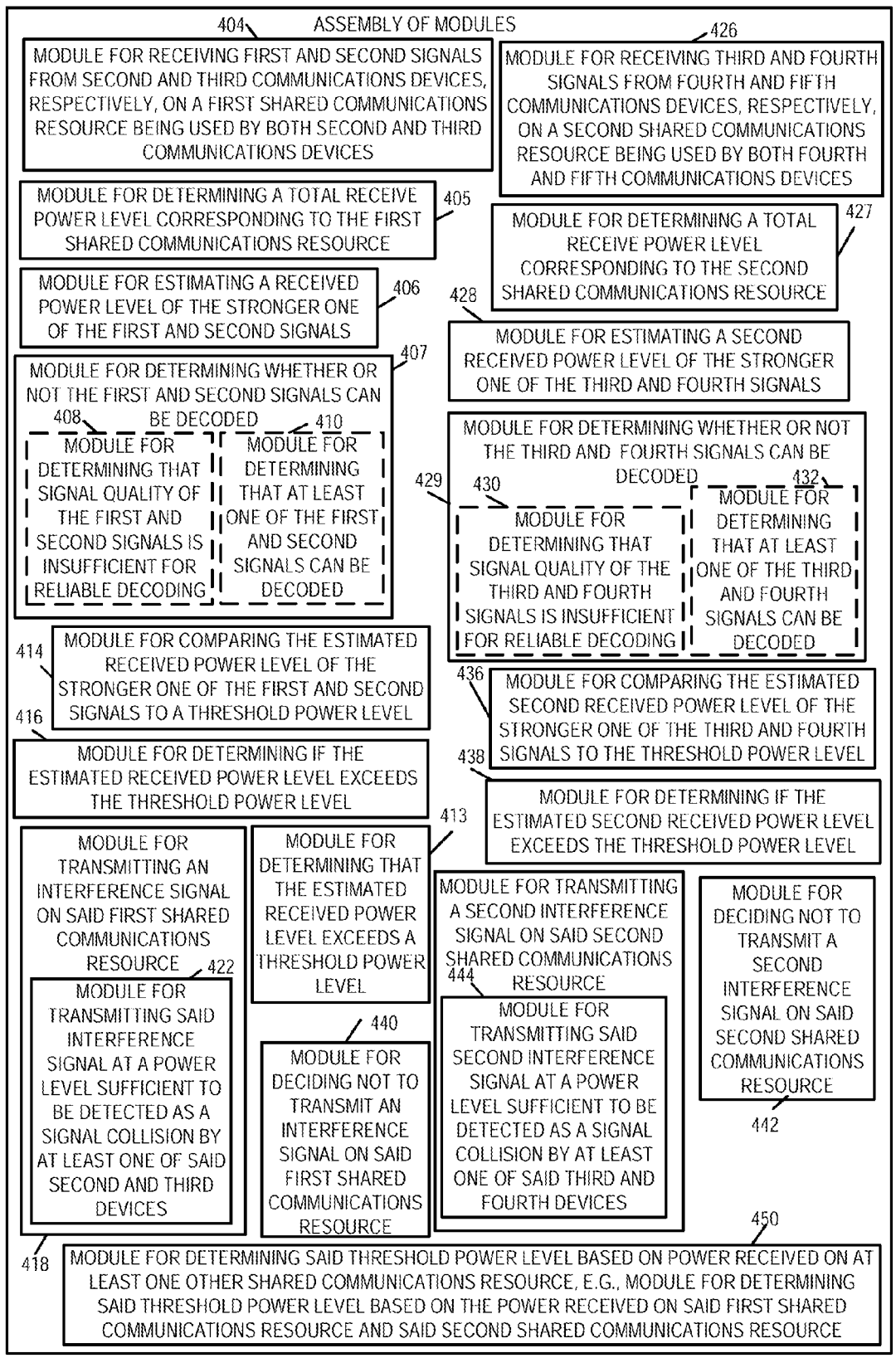
FIG. 4 is an assembly of modules which can, and in some embodiments is, used in the first communications device illustrated in FIG. 3.

FIG. 4 is an assembly of modules 400 which can, and in some embodiments is, used in the communications device 300 illustrated in FIG. 3. The modules in the assembly 400 can be implemented in hardware within the processor 302 of FIG. 3, e.g., as individual circuits. Alternatively, the modules may be implemented in software and stored in the memory 304 of the communications device 300 shown in FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the communications device 300 or elements therein such as the processor 302, to perform the functions of the corresponding steps illustrated in the method flowchart 200 of FIG. 2.

Assembly of modules 400 includes a module 404 for receiving first and second signals from second and third communications devices, respectively, on a first shared communications resource being used by both second and third communications devices, a module 405 for determining a total received power level corresponding to the first shared communications resource, a module 406 for estimating a received power level of the stronger one of the first and second signals, a module 407 for determining whether or not the first and second signals can be decoded, a module 414 for comparing the estimated received power level of the stronger one of the first and second signals to a threshold power level, a module 416 for determining if the estimated received power level exceeds the threshold power level, a module 413 for determining that the estimated received power levels exceeds a threshold power level, a module 418 for transmitting an interference signal on said first shared communications resource, and a module 420 for deciding not to transmit an interference signal on said first shared communications resource.

Module 407 includes a module 408 for determining that signal quality of the first and second signals is insufficient for reliable decoding and a module 410 for determining that at least one of the first and second signals can be decoded. Module 418 includes a module 422 for transmitting said interference signal at a power level sufficient to be detected as a signal collision by at least one of said second and third devices.

Assembly of modules 400 further includes: a module 426 for receiving third and fourth signals from fourth and fifth communications devices, respectively, on a second shared communications resource being used by both fourth and fifth communications devices, a module 427 for determining a total receive power level corresponding to second shared communications resource, a module 428 for estimating a second received power level of the stronger one of the third and fourth signals, a module 429 for determining whether or not the third and fourth signals can be decoded, a module 436 for comparing the estimated second received power level of the stronger one of the third and fourth signals to the threshold power level, a module 438 for determining if the estimated second received power level exceeds the threshold power level, a module 440 for transmitting a second interference signal on said second shared communications resource, and a module 442 for deciding not to transmit a second interference signal on said second shared communications resource, e.g., a module for deciding not to transmit a second interference signal on said second shared communications resource upon said module 436 and /or said module 438 determining that the second estimated received power level does not exceed said threshold power level.

Module 429 include a module 430 for determining that signal quality of the third and fourth signals is insufficient for reliable decoding and a module 432 for determining that at least one of the third and fourth signals can be decoded. Module 440 includes a module 444 for transmitting said second interference signal at a power level sufficient to be detected as a signal collision by at least one of said third and fourth devices. Assembly of modules 400 also includes a module 450 for determining said threshold power level based on power received on at least one other shared communications resource, e.g., a module for determining said threshold power level based on the power received on said first shared communications resource and said second shared communications resource.

Figure 5:
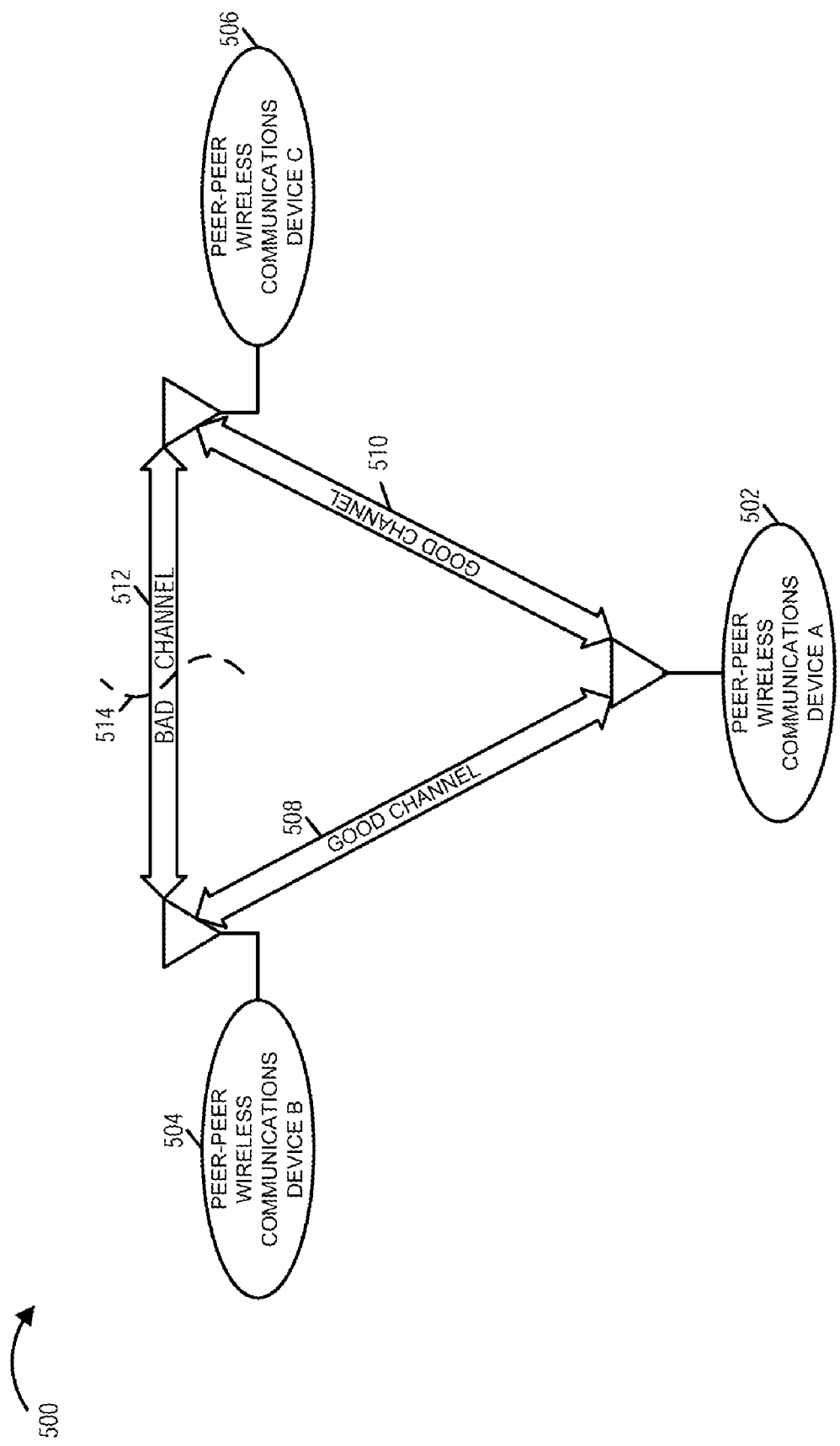
FIG. 5 is a drawing illustrating exemplary peer to peer communications devices in a wireless communications network and is used to describe an exemplary method of operating a communications device.

FIG. 5 is a drawing 500 illustrating exemplary peer to peer communications devices in a wireless communications network and is used to describe an exemplary method of operating a communications device. The peer to peer communications devices (device A 502, device B 504, device C 506) are, e.g., any of the wireless communications devices of system 100 of FIG. 1. Consider, for example, that peer to peer wireless communications device A 502 is the first communications device 300 of FIG. 3 implementing a method in accordance with flowchart 200 of FIG. 2.

In the example of FIG. 5, consider that there is a good wireless communications channel 508 between device B 504 and device A 502 and that there is a good wireless communications channel 510 between device C 506 and device A 502. Further, consider that there is a bad wireless communications channel 512 between device B 504 and device C 506, e.g., because of obstruction 514.

Consider that the exemplary peer to peer communications system is a decentralized network, that the wireless devices (502, 504, 506) transmit discovery signals using discovery air link resources. Further consider that a wireless communications device selects a discovery identifier associated with a set of discovery air link resources to transmit its discovery signals.

Consider that device A 502 and device B 504 have each selected different peer discovery IDs and are transmitting their peer discovery signals on different air link resources. Continuing with the example, consider that device C 506 decides it would like to transmit peer discovery signals. Device C 506 monitors the peer discovery signals it can receive and determines that the peer discovery resource ID associated with device A 502 is occupied. However, due to the bad channel 512, device C 506 is unaware of device B 504 peer discovery transmissions. Consider that device C 506 happens to select the same peer discovery ID currently in use by device B 504. Now device B 504 and device C 506 transmit their peer discovery signals using the same air link resources. From the perspective of device A 502, the concurrent transmissions are interfering with one another, preventing the recovery of received peer discovery information from one or more of device B 504 and device C 506.

Device A 502, generates and transmits an interference signal on the peer discovery air link resource being used by device B 504 and device C 506. Since the channels (508, 510) between device A 502 and devices (device B 504, device C 506), respectively, are good, the interference signal is detected by both device B 504 and device C 506. One or more of device B 504 and device C 506 take corrective action, e.g., switch to another peer discovery ID associated with a different set of air link resources.

Figure 6:
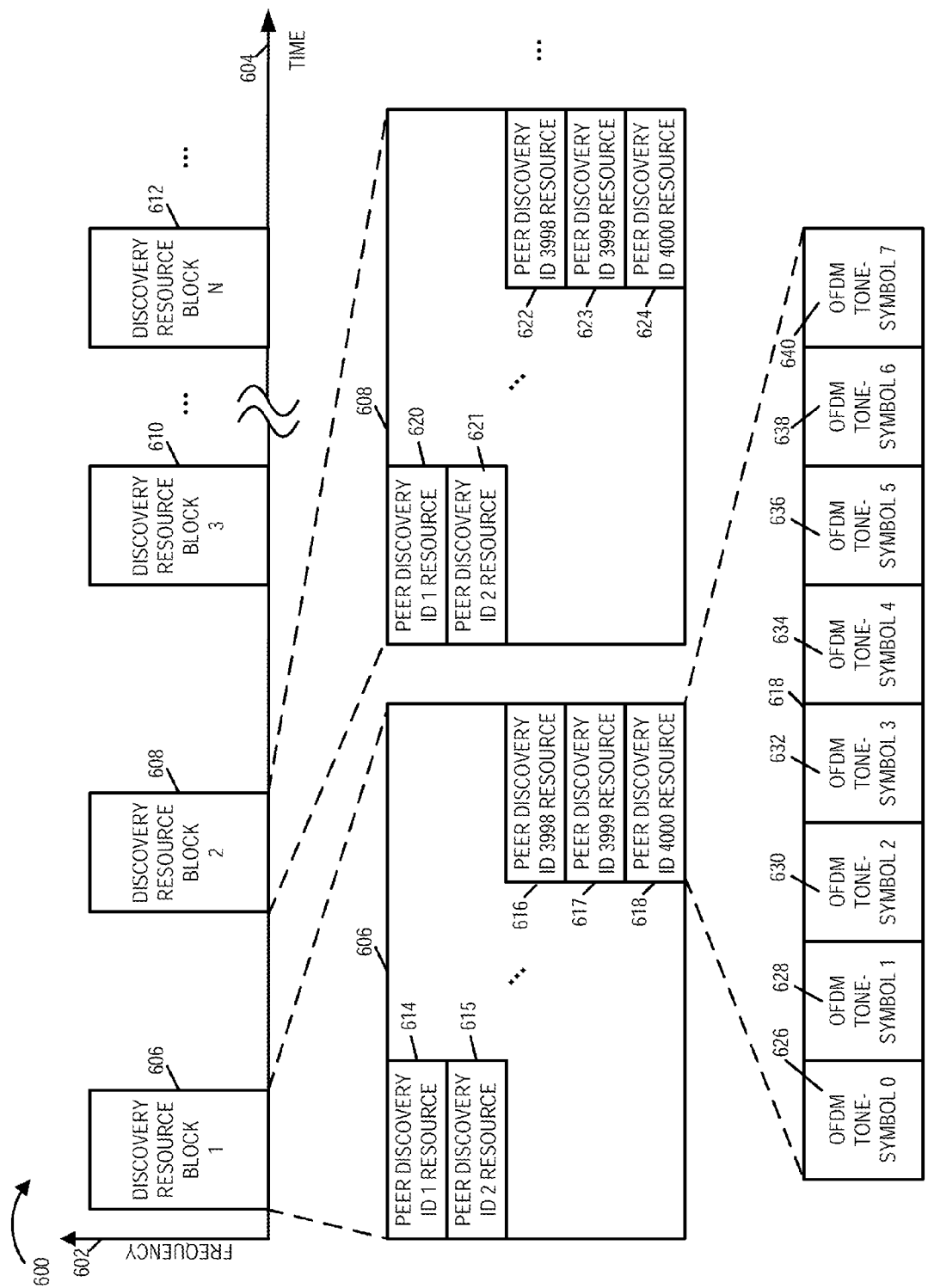
FIG. 6 is a drawing illustrating an exemplary recurring peer to peer timing structure used in some embodiments.

FIG. 6 is a drawing illustrating an exemplary recurring peer to peer timing structure used in some embodiments. Plot 600 includes a vertical axis 602 representing frequency, e.g., OFDM tones, and a horizontal axis 604 representing time, e.g., OFDM symbol transmission time intervals. In the example of FIG. 6 the air link resources of the timing structure include discovery resource blocks (discovery resource block 1 606, discovery resource block 2 608, discovery resource block 3 610, . . . , discovery resource block N 612).

Each discovery resource block (606, 608, 610, . . . , 612) includes individual peer discovery resources, e.g., segments, associated with different peer discovery identifiers. In this example, there are 4000 peer discovery resource identifiers and each identifier is associated with an individual peer discovery resource, e.g., segment, in the block. For example, discovery resource block 1 606 includes peer discovery ID 1 resource 614, peer discovery ID 2 resource 615, . . . , peer discovery ID 3998 resource 616, peer discovery ID 3999 resource 617, and peer discovery ID 4000 resource 618. Similarly, discovery resource block 2 608 includes peer discovery ID 1 resource 620, peer discovery ID 2 resource 621, . . . , peer discovery ID 3998 resource 622, peer discovery ID 3999 resource 623, and peer discovery ID 4000 resource 624.

In this example, each individual peer discovery resource of a peer discovery block, e.g., peer discovery ID 3999 resource 617, is a contiguous set of resources. In some embodiments, an individual peer discovery resource may, and sometimes does, include non-contiguous portions, e.g., a first portion associated with a first tone and a second portion associated with a second tone, where the first and second tones are not adjacent tones. In this example, a peer discovery resource associate with a particular peer discovery ID is located in the same relative position in each of the peer discovery resource blocks. For example, peer discovery ID 1 resource 614 of peer discovery resource block 606 is in the uppermost corner, e.g., high frequency and first time slot, and peer discovery ID resource 620 of discovery resource block 2 608 is also in the uppermost corner. In some embodiments, the relative position of the individual resource associated with a particular peer discovery identifier may, and sometimes does, change from one discovery resource block to another, e.g., in accordance with a hopping pattern known to the peer to peer wireless communications devices.

Corresponding to each individual peer discovery resource associated with an identifier in a discovery resource block, there is a set of basic transmission units. In this example, each segment includes eight OFDM tone-symbols, where a tone-symbol is the transmission unit of one tone for the duration of one symbol transmission time period. For example, peer discovery ID 4000 resource 618 of discovery resource block 606 includes OFDM tone-symbol 0 626, OFDM tone-symbol 1 628, OFDM tone-symbol 2 630, OFDM tone-symbol 3 632, OFDM tone-symbol 4 634, OFDM tone-symbol 5 636, OFDM tone-symbol 6 638, OFDM tone symbol 7 640.

Figure 7:
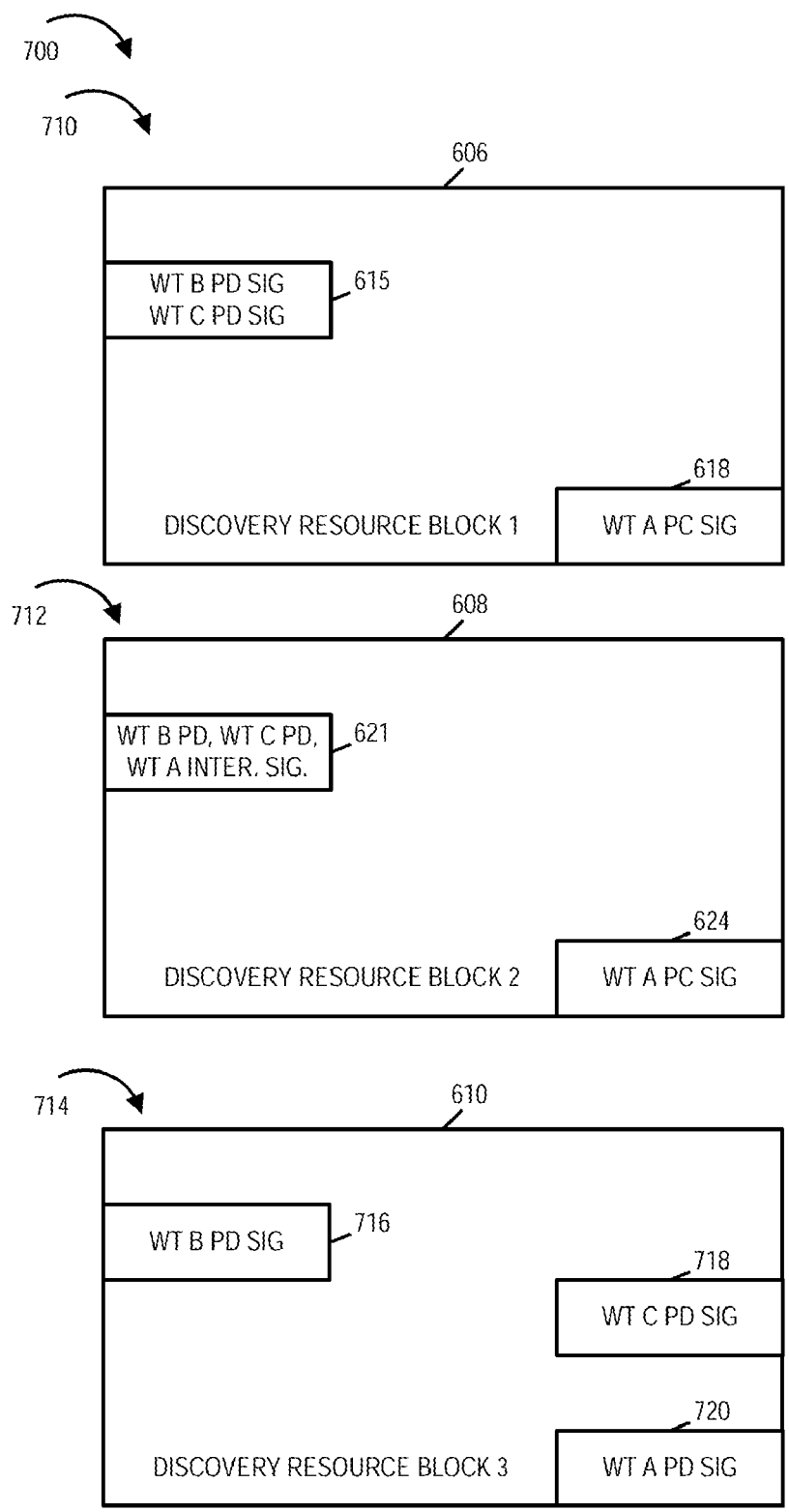
FIG. 7 illustrates an exemplary sequence of discovery resource blocks and illustrates exemplary signaling carried by those air link resources.

FIG. 7 illustrates an example corresponding to the situation of FIG. 5 where the devices (device A 502, device B 504, device C 506) are implementing and using the exemplary recurring peer to peer timing structure of FIG. 6. Drawing 700 illustrates a sequence of discovery resource blocks and illustrates exemplary signaling carried by those air link resources.

Consider that device B 504 and device C 506 are unaware of each other and have selected the same peer discovery device identifier, e.g., peer discovery ID=2. Device A 502 is using peer discovery identifier=4000. Drawing 710 illustrates that in discovery resource block 1 606, device A 502 transmits its peer discovery signal on resource 618, device B 506 transmits its peer discovery signal on resource 615, and device C 508 transmits its peer discovery signal on resource 615.

Device A 502 is unable to recover and decode the peer discovery signals being communicated by device B 504 and device C 506 since both signals are being communicated on the same air link resource 615 and are interfering with one another. Device A 502 measures received power and estimates a received power corresponding to the stronger one of the two received signals. Then device A 502 compares the estimated received power of the stronger signal to a threshold power level. In this example, consider that the estimated received power exceeds the threshold level. In this situation device A 502 decides that it would be beneficial to transmit an interference signal to cause at least one of device B 504 and device C 506 to change to a different peer discovery ID.

However, if the estimated received power was below the threshold power level, device A 502 would have decided not to transmit an interference signal. For example, in such a situation device A 502 may have estimated that it would not be able to recover either signal even if there was no common transmission on the resource associated with peer discovery device ID=2 due to the received signals being too weak.

Device B 504 and device C 506 are unaware of this undesirable situation, due to the bad channel 512, and would continue to transmit their peer discovery on the same resource without some outside intervention. Device A 502 generates and transmits an interference signal on the air link resource associated with peer discovery identifier =2, in order to cause one or more of device B 504 and device C 506 to change to a different peer discovery identifier. Drawing 712 illustrates that in discovery resource block 2 624, device A 502 transmits its peer discovery signal on resource 624, device B 506 transmits its peer discovery signal on resource 621, and device C 508 transmits its peer discovery signal on resource 621. In addition, device A 502 transmits an interference signal on resource 621.

Device B 504 receives at least a portion of the interference signal from device A 502 communicated on resource 621 and recognizes that there is conflict with regard to peer discovery identifier=2. Device C 506 receives at least a portion of the interference signal from device A 502 communicated on resource 621 and recognizes that there is conflict with regard to peer discovery identifier=2.

In this example, device C 506 decides to switch to a different peer discovery identifier, e.g., peer discovery identifier=3998. Drawing 714 illustrates that in subsequent discovery resource block 3 610, device A 502 transmits its peer discovery signal on resource 720 which is mapped to peer discovery ID=4000, device B 504 transmits its peer discovery signal on resource 716 which is mapped to peer discovery ID=2, and device C 506 transmits its peer discovery signal on resource 718 which is mapped to peer discovery identifier=3998. Now there is no longer a conflict regarding air link resources associated with peer discovery identifier=2, and device A 502 is able to receive and recover peer discovery signals from both device B 504 and device C 506.

Figure 8:
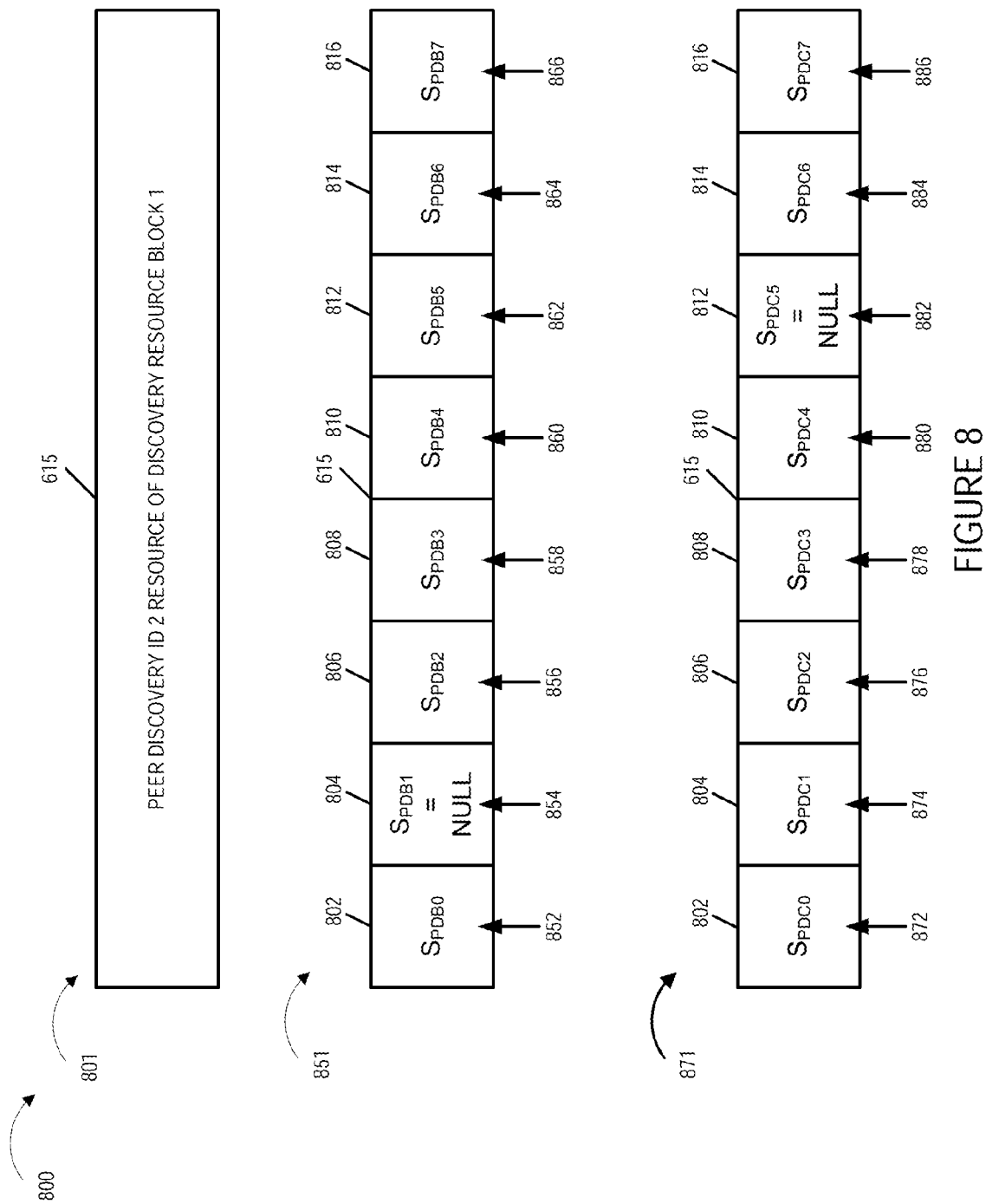
FIG. 8 is a drawing illustrating exemplary peer discovery signals being transmitted on the same peer discovery resource from two devices which are unaware of the presence of each other.

FIG. 8 is a drawing 800 illustrating exemplary peer discovery signals being transmitted on the same peer discovery resource from two devices which are unaware of the presence of each other. Drawing 801 illustrates exemplary peer discovery ID 2 resource 615 of discovery resource block 1 606 illustrated in FIG. 6. Drawing 851 illustrates that peer discovery ID 2 resource 615 includes eight OFDM tone symbols (802, 804, 806, 808, 810, 812, 814, 816) and is carrying a peer discovery signal from device B 504. In the illustrated example, which also corresponds to FIG. 7, device B 504 is transmitting a peer discovery signal using peer discovery ID 2 resource 615. The peer discovery signal transmitted from device B 504 includes modulation symbols ($S_{PDB0}$ 852, $S_{PDB1}$=Null 854, $S_{PDB2}$ 856, $S_{PDB3}$ 858, $S_{PDB4}$ 860, $S_{PDB5}$ 862, $S_{PDB6}$ 864, $S_{PDB7}$ 866) on tone-symbols (802, 804, 806, 808, 810, 812, 814, 816), respectively. Drawing 871 illustrates that peer discovery ID 2 resource 615 which includes the eight OFDM tone symbols (802, 804, 806, 808, 810, 812, 814, 816) is also carrying a peer discovery signal from device C 506. In the illustrated example, which also corresponds to FIG. 7, device C 506 is transmitting a peer discovery signal using peer discovery ID 2 resource 615. The peer discovery signal transmitted from device C 506 includes modulation symbols ($S_{PDC0}$ 872, $S_{PDC1}$ 874, $S_{PDC2}$ 876, $S_{PDC3}$ 878, $S_{PDC4}$ 880, $S_{PDC5}$=NULL 882, $S_{PDC6}$ 884, $S_{PDC7}$ 886) on tone-symbols (802, 804, 806, 808, 810, 812, 814, 816), respectively.

In accordance with a feature of some embodiments, the transmitted peer discovery signal includes an intentional NULL on at least one OFDM tone-symbol of the peer discovery resource 615. In some embodiments, the decision, for the transmitting device, as to which resource to place the NULL is based on a pseudo-random selection implementation. Thus, it is likely that two devices which are using shared peer discovery resource 615 will be placing a NULL on different OFDM tone-symbols of the resource.

With regard to device B 504, during its intentional NULL, e.g., the time of OFDM tone-symbol 804, device B 504 can receive and monitor signals being transmitted from other devices, e.g., other peer discovery signals and intentional interference signals. With regard to device C 506, during its intentional NULL, e.g., the time of OFDM tone-symbol 812, device C 506 can receive and monitor signals being transmitted from other devices, e.g., other peer discovery signals and intentional interference signals. With regard to device A 502, device A can monitor the set of OFDM tones symbols (802, 804, 806, 808, 810, 812, 814, 816) and determine total power information, an estimated power corresponding to the stronger of the two received peer discovery signals, and an estimated interference power level. The intentional NULLs are beneficial to device A 502 in these estimations.

Figure 9:
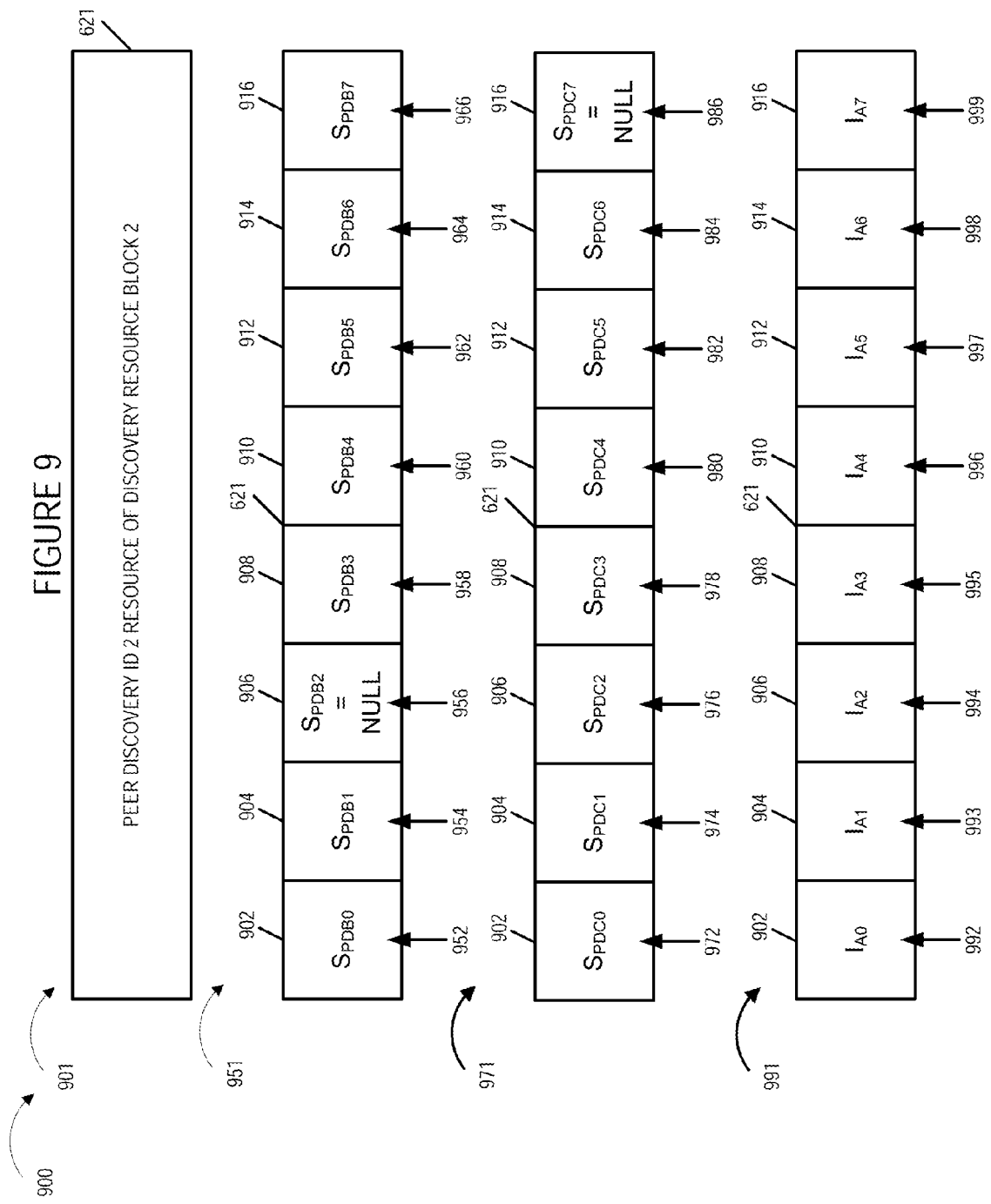
FIG. 9 is a drawing illustrating exemplary peer discovery signals being transmitted on the same peer discovery resource from two devices which are unaware of the presence of each other and an intentional interference signal being transmitted on the same peer discovery resource from a third device.

FIG. 9 is a drawing 900 illustrating exemplary peer discovery signals being transmitted on the same peer discovery resource from two devices which are unaware of the presence of each other and an intentional interference signal being transmitted on the same peer discovery resource from a third device. The intentional interference signal is being transmitted in order to cause at least one of the two devices transmitting a peer discovery signal on the same resource to switch to a different resource.

Drawing 901 illustrates exemplary peer discovery ID 2 resource 621 of discovery resource block 2 608 illustrated in FIG. 6. Drawing 951 illustrates that peer discovery ID 2 resource 621 includes eight OFDM tone symbols (902, 904, 906, 908, 910, 912, 914, 916) and is carrying a peer discovery signal from device B 504. In the illustrated example, which also corresponds to FIG. 7, device B 504 is transmitting a peer discovery signal using peer discovery ID 2 resource 621. The peer discovery signal transmitted from device B 504 includes modulation symbols ($S_{PDB0}$ 952, $S_{PDB1}$ 954, $S_{PDB2}$=Null 956, $S_{PDB3}$ 958, $S_{PDB4}$ 960, $S_{PDB5}$ 962, $S_{PDB6}$ 964, $S_{PDB7}$ 966) on tone-symbols (902, 904, 906, 908, 910, 912, 914, 916), respectively.

Drawing 971 illustrates that peer discovery ID 2 resource 621 which includes the eight OFDM tone symbols (902, 904, 906, 908, 910, 912, 914, 916) is also carrying a peer discovery signal from device C 506. In the illustrated example, which also corresponds to FIG. 7, device C 506 is transmitting a peer discovery signal using peer discovery ID 2 resource 621. The peer discovery signal transmitted from device C 506 includes modulation symbols ($S_{PDC0}$ 972, $S_{PDC1}$ 974, $S_{PDC2}$ 976, $S_{PDC3}$ 978, $S_{PDC4}$ 980, $S_{PDC5}$ 982, $S_{PDC6}$ 984, $S_{PDC7}$=NULL 986) on tone-symbols (902, 904, 906, 908, 910, 912, 914, 916), respectively.

Drawing 991 illustrates that peer discovery ID 2 resource 621 which includes the eight OFDM tone symbols (902, 904, 906, 908, 910, 912, 914, 916) is also carrying an intentional interference signal from device A 502. In the illustrated example, which also corresponds to FIG. 7, device A 502 is transmitting an interference signal using peer discovery ID 2 resource 621. The interference signal transmitted from device A 502 includes modulation symbols ($I_{A0}$ 992, $I_{A1}$ 993, $I_{A2}$ 994, $I_{A3}$ 995, $I_{A4}$ 996, $I_{A5}$ 997, $I_{A6}$ 998, $I_{A7}$ 999) on tone-symbols (902, 904, 906, 908, 910, 912, 914, 916), respectively.

Device B 504 which is monitoring during the time of its NULL, which is the time of tone-symbol 906 is able to receive and recover interference modulation symbol $I_{A2}$ 994. Device C 506 which is monitoring during the time of its NULL, which is the time of tone-symbol 916 is able to receive and recover interference modulation symbol $I_{A7}$ 999. Based on the detected interference signal one or both of device (504, 506) switch to a different peer discovery identifier. For example, in FIG. 7 device C switches from peer discovery identifier 2 to peer discovery identifier 3998.

Figure 10:
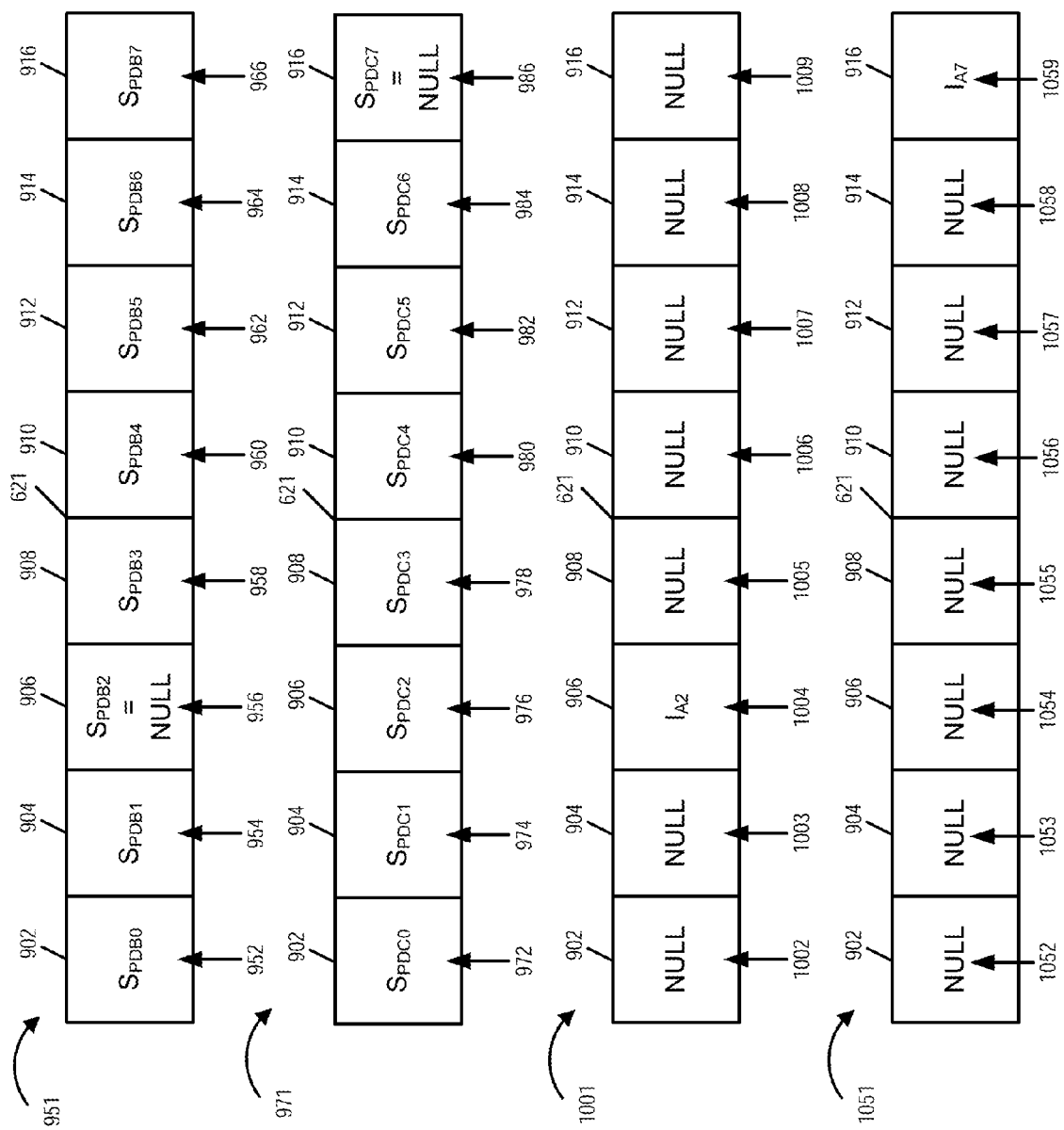
FIG. 10 illustrates exemplary alternative interference signals for an embodiment in which the device generating the interference signal is aware of the OFDM tone-symbol which is to be used for an intentional null corresponding to a particular device.

FIG. 10 illustrates exemplary alternative interference signals for an embodiment in which the device generating the interference signal is aware of the OFDM tone-symbol which is to be used for an intentional null corresponding to a particular device. For example, device A 502, in some embodiments, may be able to predict the location of an intentional null, e.g., based on a predetermined null hopping pattern being implemented by a particular device transmitting peer discovery signals. FIG. 10 includes previously presented drawing 951 illustrating an exemplary peer discovery signal from device B 504 on peer discovery ID 2 resource 621 and previously presented drawing 971 illustrating an exemplary peer discovery signal from device C 506 on peer discovery ID 2 resource 621.

Drawing 1001 illustrates a first alternative interference signal generated and transmitted by device A 502 intended to cause device B 504 to switch to a different peer discovery resource identifier. The interference signal transmitted from device A 502 includes modulation symbols (NULL 1002, NULL 1003, $I_{A2}$ 1004, NULL 1005, NULL 1006, NULL 1007, NULL 1008, NULL 1009) on tone-symbols (902, 904, 906, 908, 910, 912, 914, 916), respectively.

Drawing 1051 illustrates a second alternative interference signal generated and transmitted by device A 502 intended to cause device C 506 to switch to a different peer discovery resource identifier. The interference signal transmitted from device A 502 includes modulation symbols (NULL 1052, NULL 1053, NULL 1054, NULL 1055, NULL 1056, NULL 1057, NULL 1058, $I_{A7}$ 1059) on tone-symbols (902, 904, 906, 908, 910, 912, 914, 916), respectively.

Figure 11:
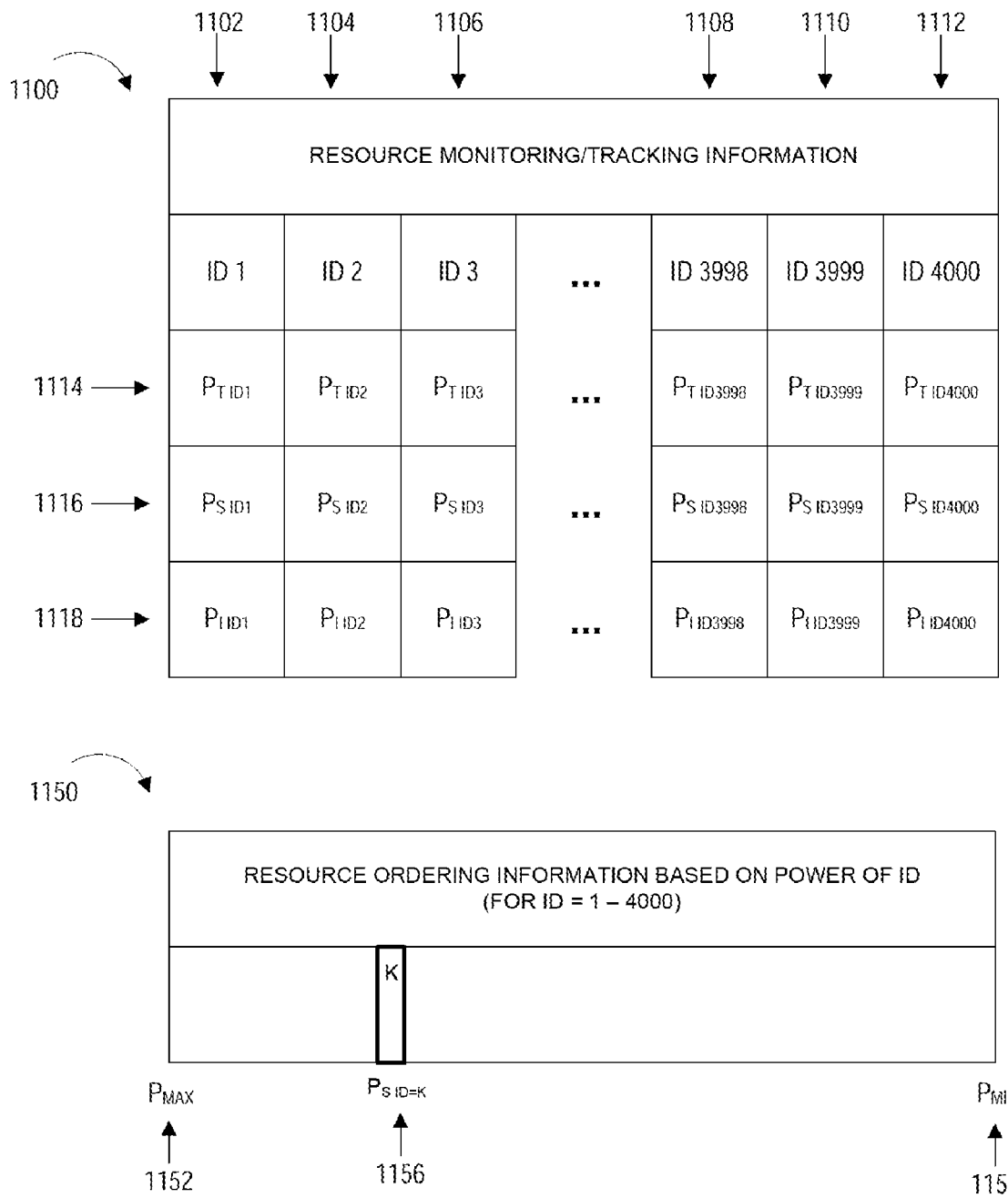
FIG. 11 illustrates an exemplary table of peer discovery resource monitoring/tracking information and an exemplary table of peer discovery resource ordering information which is maintained and used in some embodiments.

FIG. 11 illustrates an exemplary table of peer discovery resource monitoring/tracking information 1100 and an exemplary table of peer discovery resource ordering information 1150 which is maintained and used in some embodiments. In some embodiments, a peer to peer device measures power level information corresponding to a set of peer discovery resources, determines total power information on a per identifier basis, determines power level information corresponding to a strongest received signal on a per identifier basis, determines interference power information on a per identifier basis. Table 1100 represents a collection of such information. The information of table 1100 can be, and sometimes is used by a device to determine when it should generate and transmit an interference signal, e.g., it is used by device A 502 in deciding to generate and transmit an interference signal.

Table 1100 is a table of resource monitoring/tracking information and include a column corresponding to each of the peer discovery resource identifiers. Column 1102 is for ID 1 information; column 1104 is for ID 2 information; column 1106 is for ID 3 information; . . . ; column 1108 is for ID 3998 information; column 1110 is for ID 3999 information; column 1112 is for ID 4000 information. Row 1114 lists a received total power measurement corresponding to each identifier. Row 1116 lists an estimated received power for the strongest received peer discovery signal corresponding to each identifier. Row 1118 lists an interference power level corresponding to each identifier.

In addition, in some embodiments, the peer discovery device orders the identifiers according based on strongest signal received power estimations. Table 1150 represents such a resource order. In some embodiments, the resource ordering information is used by a device, e.g., by device C 506 of the example of FIG. 7, to decide which ID to select when making a change. In some embodiments, the device making the change selects a new identifier to use corresponding to a low power level.

Table 1150 lists resource ordering information based on power information associated with identifiers for each of the 4000 different peer discovery identifiers. At one extreme is the maximum power $P_{max}$ 1152, while at the other extreme is the minimum power $P_{min}$ 1154. Each identifier is mapped to a position on the table based on the strongest received power measurement information corresponding to the identifier. For example, exemplary peer discovery identifier=K has a power level $P_{SID=K}$ which maps to the position indicated by arrow 1156.

Figure 12A:
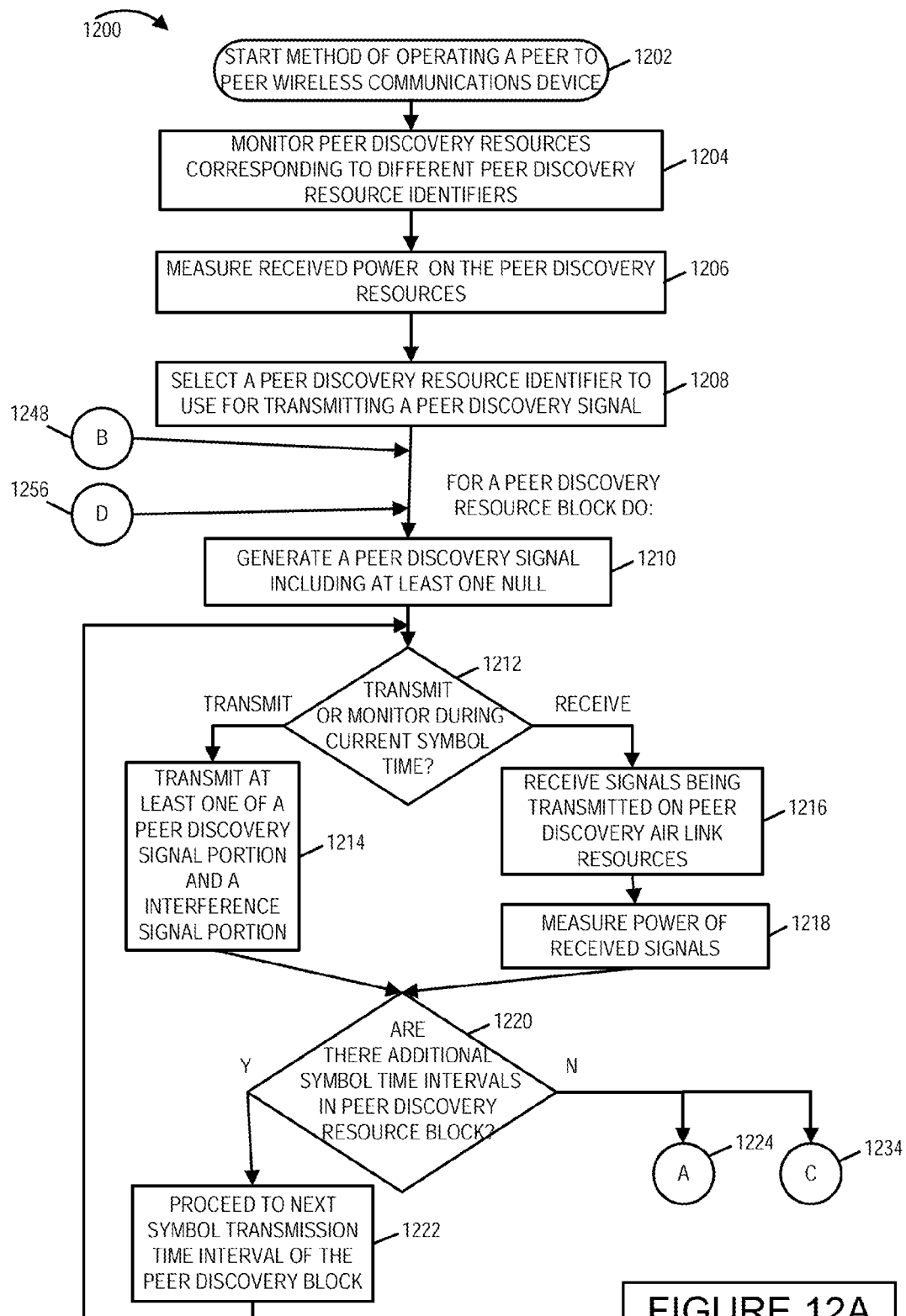
FIG. 12A is a first portion of a flowchart of an exemplary method of operating a peer to peer wireless communications device in accordance with an exemplary embodiment.
Figure 12B:
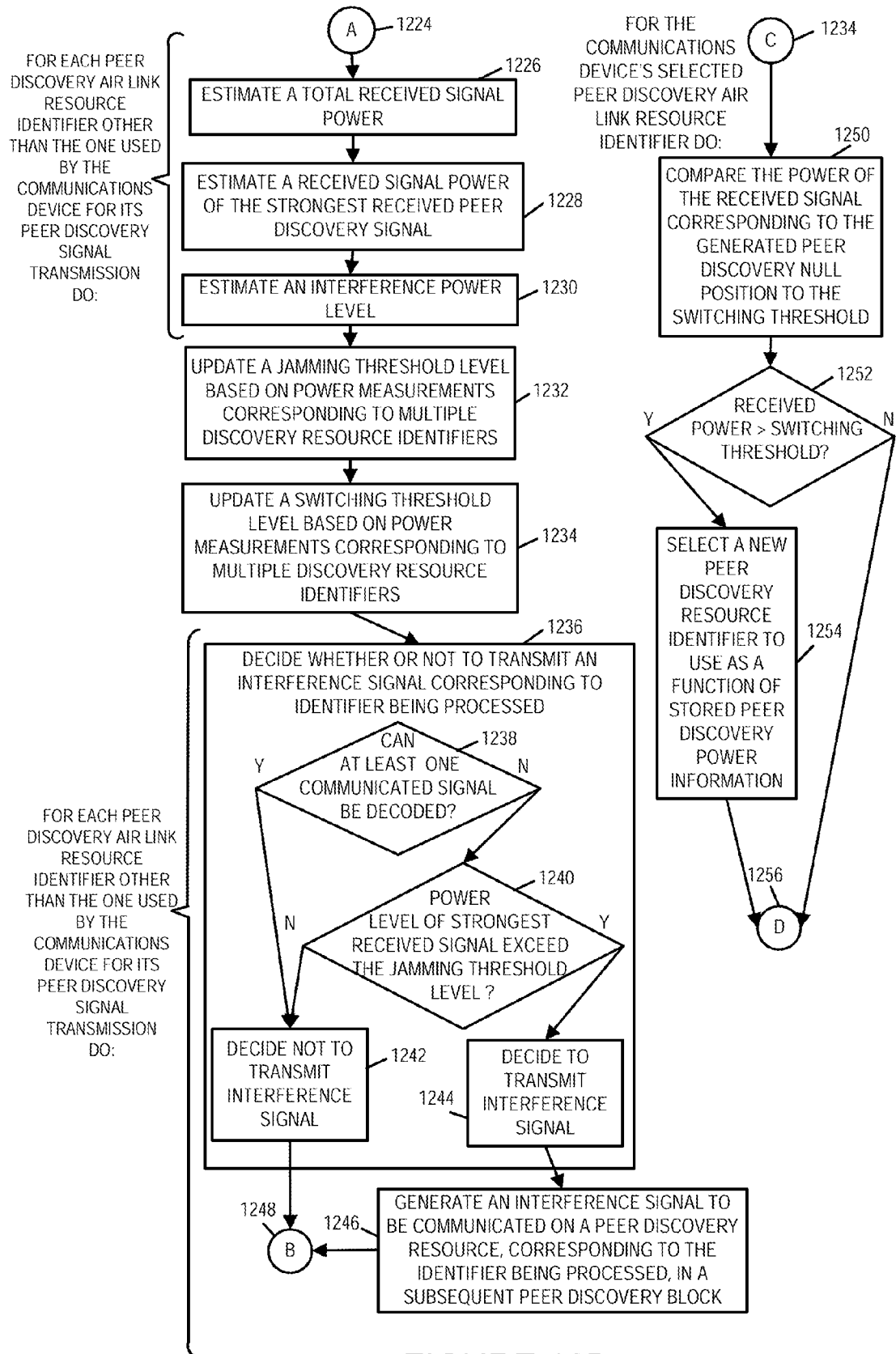
FIG. 12B is a second portion of a flowchart of an exemplary method of operating a peer to peer wireless communications device in accordance with an exemplary embodiment.

FIG. 12, comprising the combination of FIG. 12A and FIG. 12B is a flowchart 1200 of an exemplary method of operating a peer to peer wireless communications device in accordance with an exemplary embodiment. Operation starts in step 1202, where the communications device is powered on and initialized and proceeds to step 1204.

In step 1204, the communications device monitors peer discovery air link resources corresponding to different peer discovery resource identifiers. For example, in one embodiment there are 4000 different peer discovery resource identifiers and each identifier is associated with a different peer discovery air link resource of a peer discovery resource block. In some embodiments, a peer discovery air link resource associated with a peer discovery identifier comprises a set of OFDM tone-symbols, e.g., a set of 8 OFDM tone-symbols.

Operation proceeds from step 1204 to step 1206. In step 1206 the communications device measures the received power on the peer discovery resources. Then, in step 1208 the communications device selects a peer discovery resource identifier to use for transmitting a peer discovery signal based on the power measurement information. For example, the communications device selects an identifier corresponding to a resource in which the received power level was very low. In this way, the communications device is attempting to select an identifier which is not currently in use in the local vicinity. However, there is a possibility that another node in the local vicinity is already using the selected identifier, but channel conditions between the communications device and the another node were poor, so that the communications device is unaware of the presence of the another node. Various features facilitate a third party to detect contention conflicts and signal to resolve such conflicts, e.g., generate and transmit an interference signal intended to cause an identifier switch.

Operation proceeds from step 1208 to step 1210. Steps within the set of steps 1210, 1212, 1214, 1216, 1218, 1220 and 1222 are performed for supporting communications in a peer discovery resource block. In step 1210 the communications device generates a peer discovery signal including at least one null. The generated peer discovery signal is to be transmitted by the communications device using the peer discovery air link resource corresponding to selected identifier. Operation proceeds from step 1210 to step 1212.

In step 1212 the communications device determines whether it is to transmit or monitor during the current symbol transmission time interval. The communications device will transmit during the current symbol transmission time interval if the communications device is scheduled to transmit a non-NULL peer discovery modulation symbol and/or an interference modulation symbol during the current symbol transmission time interval. Otherwise, the communications device will receive during the current symbol transmission time interval. If the communications device is to transmit, then operation proceeds from step 1212 to step 1214. In step 1214 the communications device transmits at least one of a peer discovery signal portion and an interference signal portion, e.g., a non-NULL modulation symbol of its own peer discovery signal and/or an interference modulation symbol. Operation proceeds from step 1214 to step 1220.

Returning to step 1212, if the communications device determines that it is not to transmit, then operation proceeds from step 1212 to step 1216. In step 1216 the communications device receives signals being communicated on peer discovery air link resources. Sometimes, on the same air link resource, signals may be received from two transmitting nodes using the same peer discovery identifier. Operation proceeds from step 1216 to step 1218 in which the communications device measures the power of the received signals. Operation proceeds from step 1218 to step 1220.

In step 1220 the communications device checks as to whether or not there are additional symbol time intervals in the peer discovery resource block. If there is at least one additional symbol time interval in the peer discovery resource block, then operation proceeds from step 1220 to step 1222, in which the communications device proceeds to the next symbol transmission time interval of the peer discovery block. Operation proceeds from step 1222 to step 1212.

Returning to step 1220, if in step 1220 the communications device determines that there are not any additional symbol transmission time intervals in the peer discovery resource block, then operation proceeds from step 1220 via connecting node A 1224 to step 1226 and via connecting node C 1234 to step 1250.

The flow through steps 1226, 1228, and 1230 is performed corresponding to each peer discovery air link resource identifier other than the one used by the communications device for its peer discovery signal transmission. In step 1226 the communications device estimates a total received power. Then in step 1228 the communications device estimates a received signal power of the strongest received peer discovery signal. Misalignment between intentional NULLs using the same air link resource associated with the same peer discovery identifier facilitates this measurement. Then, in step 1230 the communications device estimates an interference power level. For example, corresponding the peer discovery air link resource identifier k, the wireless communications device obtain a value $P_T(k)$ from step 1226, a value $P_S(k)$ from step 1228, and a value $P_I(k)$ from step 1230. After each of the peer discovery air link resource identifiers are processed, operation proceeds from step 1230 to step 1232.

In step 1232 the communications device updates a jamming threshold level based on power measurements corresponding to multiple discovery resource identifiers. For example, in step 1232 the wireless device generates a jamming threshold value $T_{JAM}=T_2 P^*$, where P* is a value computed as a function of power measurements corresponding to multiple resources, e.g., P*=function $(P_T(i=1), \ldots P_T(i=m), P_S(i=1), \ldots P_S(i=m))$, where m is an integer>1, and $T_2$ is a constant. Operation proceeds from step 1232 to step 1234. In step 1234 the communications device updates a switching level threshold based on power measurements corresponding to multiple discovery resource identifiers. For example, in step 1234 the wireless device generates a switching threshold value $T_{SW}$=function $(P_T(i=1), \ldots P_T(i=m), P_S(i=1), \ldots P_S(i=m), P_I(i=1), \ldots, P_I(i=m))$, where m is an integer>1. Operation proceeds from step 1234 to step 1236.

The flow including steps 1236 and 1230 is performed corresponding to each peer discovery air link resource identifier other than the one used by the communications device for its peer discovery signal transmission. In step 1236 the communications device decides whether or not to transmit an interference signal corresponding to the identifier being processed. Step 1236 includes step 1238, step 1240, step 1242 and step 1244. In step 1238 the communications device determines whether or not at least one received communicated signal can be decoded. For example, in step 1238, the communications device performs the test: is $P_S(k)/(P_T(k)-P_S(k))>T_1$, where $T_1$ is a decoding threshold value. If at least one communicated signal can be decoded then operation proceeds to step 1242, in which the communications device decides not to transmit the interference signal. However, if the communications device determines that it can not decode at least one communicated signal, then operation proceeds from step 1238 to step 1240. In step 1240, the communications device determines whether or not the power level of the strongest received signal, as determined in step 1228, exceeds a jamming threshold level. For example, in step 1240 the communications device performs the test: is $P_S(k)>T_{JAM}$? If the power level does not exceed the jamming threshold level operation proceeds from step 1240 to step 1242, where the communications device decides not to transmit an interference signal. If the strongest received signal is very weak the communications device may not be able to decode the weak signal even if the interfering signal is removed, in which case there is no point in generating an interference signal to trigger an identifier switch. Operation proceeds from step 1242 to connecting node B 1248.

Returning to step 1240, if in step 1240 the power level of the strongest signal is determined to have exceeded the jamming threshold level, then operation proceeds from step 1240 to step 1244. In step 1244 the communications device decides to transmit an interference signal. Operation proceeds from step 1244 to step 1246 in which the communications device generates an interference signal to be communicated on a peer discovery resource corresponding to the identifier being processed, in a subsequent peer discovery block. Operation proceeds from step 1246 to connecting node B 1248.

Returning to connecting node C 1234, operation proceeds from connecting node C 1234 to step 1250. The flow including steps 1250, 1252 and 1254 is performed corresponding to the selected peer discovery air link resource identifier currently being used by the communications device for its peer discovery signal transmissions. The peer discovery signal includes at least one intentional NULL. The location of an intentional NULL within a peer discovery signal is intentionally randomized so that it is likely that two devices which happen to select the same identifier will have intentional NULLs in different positions. This feature facilitates interference measurements and intentional interference signal detection.

In step 1250 the communications device compares the power of the received signal corresponding to its generated peer discovery signal NULL position to a switching threshold, e.g., $T_{SW}$. The received measured signal being evaluated in this situation can be a received modulation symbol of a discovery signal from another device using the same peer discovery identifier, or it can be an intentional interference modulation symbol communicated with the intent of causing the communications device to switch its selected peer discovery identifier. Operation proceeds from step 1250 to step 1252.

In step 1252, if the comparison of step 1250 indicated that the received power was greater than the switching threshold, then operation proceeds from step 1252 to step 1254. In step 1254 the communications device selects a new peer discovery resource identifier to use as a function of stored peer discovery power information. For example, the communications device has been tracking received power corresponding to each of the peer discovery identifiers and selects an identifier which currently has a low received power level. Operation proceeds from step 1254 to connecting node D 1256. Returning to step 1252, if in step 1252 the comparison indicated that the received power was not greater than the switching threshold, then the communications device does not change its selected peer discovery identifier, and operation proceeds from step 1252 to connecting node D 1256.

Operation proceeds from connecting node B 1248 and connecting node D 1256 to step 1210 to start communications processing corresponding to a subsequent peer discovery block. The wireless communications device transmits another peer discovery signal using the air link resource corresponding to its currently held peer discovery device identifier. The wireless communications device may, and sometimes does, transmit one or more interference signals, e.g., based on the decisions of block 1236. Timing structure information, e.g., a recurring peer to peer timing structure, is known and used by the communications device which maps particular peer discovery device identifiers to particular transmission unit resources in the peer discovery resource block.

Figure 13:
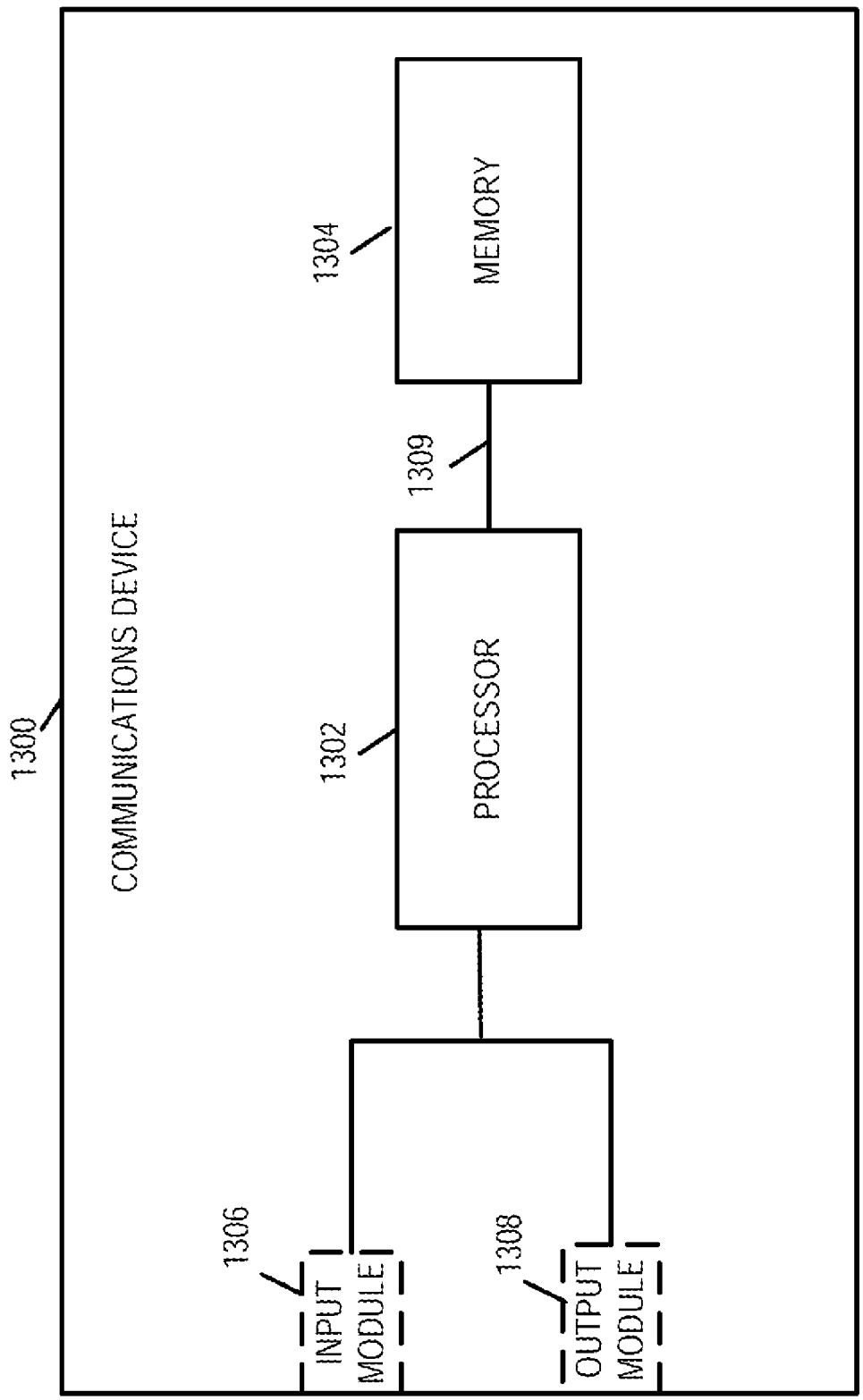
FIG. 13 is a drawing of an exemplary communications device, in accordance with an exemplary embodiment.

FIG. 13 is a drawing of an exemplary wireless communications device 1300, in accordance with an exemplary embodiment. Exemplary wireless communications device 1300 is, e.g., one of the wireless communications devices of FIG. 1. Exemplary wireless communications device 1300 may, and sometimes does, implement a method in accordance with flowchart 1200 of FIG. 12.

Wireless communications device 1300 includes a processor 1302 and memory 1304 coupled together via a bus 1309 over which the various elements (1302, 1304) may interchange data and information. Communications device 1300 further includes an input module 1306 and an output module 1308 which may be coupled to processor 1302 as shown. However, in some embodiments, the input module 1306 and output module 1308 are located internal to the processor 1302. Input module 1306 can receive input signals. Input module 1306 can, and in some embodiments does, include a wireless receiver and/or a wired or optical input interface for receiving input. Output module 1308 may include, and in some embodiments does include, a wireless transmitter and/or a wired or optical output interface for transmitting output.

Figure 14:
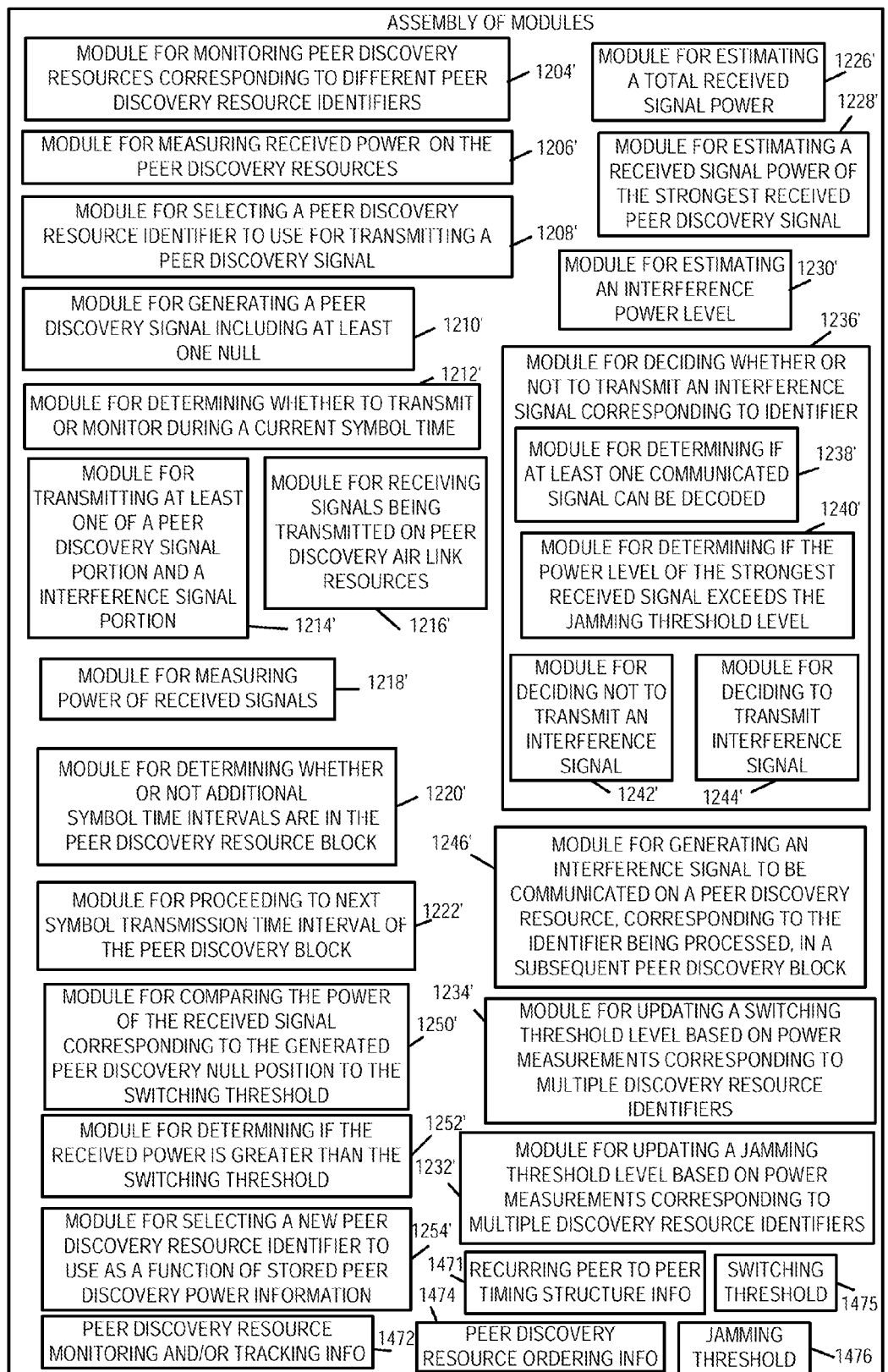
FIG. 14 is an assembly of modules which can, and in some embodiments is, used in the communications device illustrated in FIG. 13.

FIG. 14 is an assembly of modules 1400 which can, and in some embodiments is, used in the communications device 1300 illustrated in FIG. 13. The modules in the assembly 1400 can be implemented in hardware within the processor 1302 of FIG. 13, e.g., as individual circuits. Alternatively, the modules may be implemented in software and stored in the memory 1304 of the communications device 1300 shown in FIG. 13. While shown in the FIG. 13 embodiment as a single processor, e.g., computer, it should be appreciated that the processor 1302 may be implemented as one or more processors, e.g., computers. When implemented in software the modules include code, which when executed by the processor, configure the processor, e.g., computer, 1302 to implement the function corresponding to the module. In some embodiments, processor 1302 is configured to implement each of the modules of the assembly of modules 1400. In embodiments where the assembly of modules 1400 is stored in the memory 1304, the memory 1304 is a computer program product comprising a computer readable medium comprising code, e.g., individual code for each module, for causing at least one computer, e.g., processor 1302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 14 control and/or configure the communications device 1300 or elements therein such as the processor 1302, to perform the functions of the corresponding steps illustrated in the method flowchart 1200 of FIG. 12.

In the assembly of modules 1400 of FIG. 14 a module with a number followed by ' corresponds to the same or similar function as a corresponding step in flowchart 1200 of FIG. 12. In assembly of modules 1400 of FIG. 14 modules (1204', 1206', 1208', 1210', 1212', 1214', 1216', 1218', 1220', 1222', 1226', 1228', 1230', 1232', 1234' 1236', 1238', 1240', 1242', 1244', 1250', 1252', 1254') correspond to steps (1204, 1206, 1208, 1210, 1212, 1214, 1216, 1218, 1220, 1222, 1226, 1228, 1230, 1232, 1234, 1236, 1238, 1240, 1242, 1244, 1246, 1250, 1252, 1254), respectively, of flowchart 1200 of FIG. 12. For example, module 1208' of assembly of modules 1400 of FIG. 14 corresponds to and performs the function of step 1208 of flowchart 1200 of FIG. 12. Module 1208' is a module for selecting a peer discovery resource identifier to use for transmitting a peer discovery signal; in step 1208 the communications device selects a peer discovery resource identifier to use for transmitting a peer discovery signal.

Assembly of modules 1400 also includes peer to peer recurring timing structure information 1471, peer to peer resource monitoring and/or tracking information 1472 and peer discovery resource ordering information 1474. The peer to peer timing structure information 1471 includes information identifying and/or defining: peer discovery resource blocks, individual peer discovery identifier based resources within the peer discovery resource blocks, sets of basic transmission units corresponding to an individual peer discovery identifier based resource, tone characteristics, symbol transmission timing characteristics, mapping identifier based resources within the peer discovery resource block, and hopping information. FIG. 6 illustrates some exemplary peer to peer timing structure information 1471. Peer to peer resource monitoring and/or tracking information 1472 includes: information identifying which discovery resource identifier has been selected and is in use by the communications device, measured received discovery resource power information on a per identifier basis, estimated received discovery resource total power information on a per identifier basis, estimated received strongest signal discovery resource power information on a per identifier basis, and estimated discovery resource interference information on a per identifier basis. Table 1100 of FIG. 11 provides an example of some information included in peer to peer resource monitoring and/or tracking information 1472 in one exemplary embodiment. Information 1472 is used by module 1242' in deciding whether or not to transmit one or more interference signals. Peer to peer resource ordering information 1474 includes information associating each of the peer discovery resources with an estimated received power level. Drawing 1150 of FIG. 11 illustrates an example of some information included in peer to peer resource ordering information 1472. Peer to peer resource ordering information is used by module 1230' when selecting a new identifier, e.g., the communications device selects an identifier corresponding to low received power.

Assembly of modules 1400 also includes a switching threshold 1475, which is an output of module 1234' and used as an input by module 1250'. In addition assembly of modules 1400 includes a jamming threshold 1476 which is an output of module 1232' and used as an input by module 1240'.

In some exemplary peer to peer wireless communications systems, devices transmit discovery information, called an ID signal, on communications resources, e.g., time/frequency degrees of freedom, called an ID resource, that are reused across the system. In some exemplary systems, devices choose the ID resource to occupy at a given time autonomously. This can, and sometimes does, lead to a situation in which two or more devices within transmission range of each other choose the same ID resource inadvertently. When a device detects that it has collided in this way, it can choose an alternative ID resource to avoid future collisions. Sometimes, however, such a collision occurs without the involved device being able to detect the collision. This can happen because of shadowing or simply because the devices, while far away from each other, are seen to collide from an intermediate position between the devices. In such a case, e.g., in a hidden node situation, it may be desirable for a third party that detects and suffers from the collision to cause one or more of the colliding devices to switch to an alternative ID resource. The third party device, in some embodiments, accomplishes this by temporarily occupying, e.g., transmitting on, the same ID resource providing a colliding signal, e.g., an interference signal, to the hidden node or nodes. One or more of the hidden nodes will then detect the pseudo collision and switch to an alternative ID resource.

Various features and aspects of some exemplary embodiments will now be described. Some features are well suited for peer discovery operations in a wireless communications system and/or for facilitating a hidden node problem resolution. In some embodiments, there is an ID resource space which is a collection of ID resources, each tied to specific periodically recurring communications resources, e.g., degrees of freedom, that are used for discovery. The ID resource selection process is, in some such embodiments, pseudo-random, autonomous, and distributed, and aims at optimizing use of the ID resource space. Often, in optimizing use of ID resource space the range over which a device is detectable with its given transmit power and desired rate would be maximized.

Each ID resource is reused across space, different devices geographically separated may use the same ID resource. The reuse scale (distances) of the ID resources may depend on device density. In some embodiments, as density increases reuse distance decreases. Correspondingly, detectable range varies with device density. In general, with devices being mobile for example, ID resource assignment will be a dynamic process and dynamical effects should be considered in the design of such a system. The ID signal transmission may be structured so that an ID broadcast leaves one or more of the available communications resources, e.g., time-frequency units corresponding to an ID resource, void of energy. We refer to this as the NULL portion of the ID signal. Different devices may choose the NULL portion of the signal differently, e.g. pseudo-randomly, so that a transmitting device can use the voided resource to detect the presence of other devices using the same ID resource. With mobility of devices it is possible for two devices using the same ID resource to come into closer proximity with each other and therefore reduce each other's detectable range. The NULL portion of the signal may be, and sometimes is, used by the transmitting devices to monitor the ID resource for the presence of a strong interferer. Given a strong interferer the device vacates the ID resource and chooses another. Moreover, devices may estimate both signal energy and energy on the intentional NULL position of a set of communications resources corresponding to the other ID resources. This may be done by identifying the degree(s) of freedom with least energy and taking one or more of those to be the NULL communications resources of the strongest occupant of the ID resource. The receiving device's effective assumption is that there is a strongest transmitter and the receiving device is estimating its view of the ID signal environment for that strongest transmitter. It may estimate both the signal power of the strongest transmitter and the interference power arising from other transmitters and from thermal noise.

A particularly difficult problem associated to ID resource reuse is the so-called hidden node problem. In a hidden node scenario, two nodes, e.g., peer devices, may be hidden from each other, e.g., with no direct signal propagation, and accidentally choose the same ID resource. A third device nearby may receive the ID signal from both devices and detect the presence of large energy on the ID resource but be unable to decode the signal due to the high interference level. Since the transmitting devices are unable to detect their reuse of the ID resource, it falls to the third device to correct the problem. To accomplish this the third device, in some embodiments, "jams" the local ID resource by intentionally interfering with the transmissions from the devices occupying the ID resource so that the two mutually hidden nodes, or at least one of them, vacates the ID resource and chooses another. In essence the third device acts as a reflection for the ID resource collision that it observes to enable at least one of the hidden node devices to effectively become aware of the other.

Third party jamming introduces potential instability into the distributed ID resource management process. Presumably, devices will select ID resources so as to occupy an otherwise locally unoccupied ID resource. The specification of a "locally unoccupied" is an important consideration to effective implementation of any method.

In some embodiments, the basic device ID resource actions are the following:

A1: Select a ID resource for transmission and begin transmission.

A2: Vacate a ID resource—stop transmitting on a ID resource.

A3: Jam a ID resource—attempt to cause another device to take action A2 due to collision detection.

Consider what happens when a device first selects and begins to transmit on an ID resource (A1). Once transmission begins the signal from any other device using the same ID resource will suffer increased interference. In particular there may be places where prior to the new transmission the ID resource was decodable (to the signal from the strongest occupant of that ID resource) but after the new transmission begins the same ID resource becomes undecodable. In this case a device situated in such a place would potentially be in a position to jam the ID resource (A3). When a jamming signal is transmitted it may cause a device occupying the ID resource to switch resources, e.g., to vacate the current local ID (A2) and occupy another (A1). This then raises the possibility for the occurrence of another jamming event. Aggressive use of jamming can easily destabilize the ID resource selection process. In particular, if the density of devices is increasing then the decodable regions of the IDs would be expected to shrink. The decision of whether or not to jam an apparent collision should therefore depend on the observed device density.

A general principle that can be applied in the design of the jamming protocol is that a device should jam only when the probability of improving the decodability of ID resources by such an action is very high. If the jamming occurs, then the jammed device will often select a new ID resource. The device which performed the jamming should expect with high probability that with the new ID resource the ID signal will be decodable. This then depends on the distribution of the selected ID resource from the jammer's perspective. The protocol used in action Al will often require the selecting device to choose a resource on which it sees relatively little signal energy. Depending on the distance between that device and the jammer and other propagation effects the selected ID may or may not have relatively little energy from the jammer's perspective. From the jammer's perspective the distribution of possibly-selected ID resource and the energy on those ID resources will significantly impact the likelihood that the jamming event will improve the ID resource decodability situation. Thus, the protocol for taking action A3 may depend on the observed energies on the ID resources and the received signal power from the device targeted by the jammer (which gives an estimate of the distance of that device).

In some embodiments, the various actions are taken under conditions related to ID resource measurements as discussed below.

Acquire (A1):
When selecting an ID resource a device should observe sufficiently low energy on that ID resource. If the system is to scale to allow unlimited occupancy of the ID resource space then it is clear that the notion of characterization of "sufficiently low" would be density dependent. An example policy would be that devices should choose an ID resource from those whose detected energy is in the bottom 10% of the resource space and where that energy is within some number dB (e.g. 3 dB) of the minimum. This last condition is to cover the case where a small fraction, less than 10%, of the resources are actually unoccupied. Given the selection policy a device will then observe a worst case interference energy that it will suffer when it selects an ID which we denote $P_{interfere}$.

Vacate (A2):
A device should vacate its ID resource if, from measuring energy on its NULL signal portion, it determines that it is suffering interference energy significantly larger than $P_{dinterfere}$. The specification "significantly higher" is a system design decision. Often, assuming energy is expressed in dB, there will be an offset $T_{vacate}$ so that action A2 will be taken when interference energy, as observed on null tones, exceeds $T_{vacate}+P_{interefer}$. The measurement of interference is subject to noise so devices will often average across time. If a very large interference energy is detected, then action A2 may be taken more quickly. This could benefit the system in the hidden noise case since a large energy jammer then need not jam for as long a period as would otherwise be necessary to cause A2.

Jam (A3):
A device should jam an ID resource when:
1) Forcing a change of local ID on the device transmitting the most powerful signal on that local ID would render that ID decodable with high probability
2) The local ID is not currently decodable.

The Jamming signal should be strong enough so that the strongest signaling device will consequently vacate its ID resource.

We now elaborate on the jamming decision process. In some embodiments, each device monitors the ID resource space for both signal and NULL energy by measuring $P^j_{max}$ and $P^j_{min}$ the maximum energy observed on the resource and the minimum observed over a period including one NULL portion and where i ranges over the ID resources. The device maintains a threshold level $P_{interefer}$ that represents (for example) the largest value of $P^j_{max}$ among those i from which the device would select an ID resource. A device will take action A3 for a particular ID resource j in the case that both $P^j_{max}-P^j_{min}$ (the estimated signal power of the strongest occupant) and $P^j_{min}$ are unusually large. This indicates a possible hidden node problem since both the strongest user and the interference have relatively high power. To quantify the notion of unusually large it would be necessary to quantify the abnormality of the pair $P^j_{max}$ and $P^j_{min}$. This quantification would be based on the observed values of $P^j_{max}$ and $P^j_{min}$. For example, before taking action A3 it might be required that for all, or nearly all, ID resources other than the jth one, where the strongest signal has power as large as that on $P^j_{max}-P^j_{min}$, or some portion thereof, that the strongest user is decodable.

Estimation time for these various power quantities used in the decision processes can be important. Transient events, e.g., due to mobility, would preferably not cause over-reaction in ID resource management. In addition, each of the measurements are subject to noise and will fluctuate so power measurements should, and in some embodiments are, filtered in time. This impacts, e.g., the duration over which a jammer should continue to jam. Moreover, it means that large jamming power may elicit a faster reaction than a small jamming power. So the power and duration of the jamming signal should, and in some embodiments does, take into account the time constants used in the estimation filtering process.

Various implementations consider one or more of the basic issues including stability and efficiency of ID resource assignment. In addition to random drops with various propagation models, some embodiments have considered and addressed various situations.

The stadium filling scenario: Various embodiments are implemented in accordance with the goal of making sure that the system does a good job distributing IDs under dynamic density changes without too much overhead and switching.

Impact of mobility on ID space in dense/sparse settings: Various embodiments take into consideration the effects of mobility at various speeds on the ID assignment. Some embodiments are implemented with the aim to minimize the rate of unnecessary local ID change.

Some embodiments take into consideration the situation of a random initial deployment with a fair amount of shadowing (hidden nodes) to observe dynamics and final configuration (assuming convergence) of ID reuse.

Some embodiments take into consideration the situation of multiple clusters (closely packed nodes) that are within range.

Some embodiments take into consideration state tracking and state definition. Besides measuring $P_{max}$ and $P_{min}$, in some embodiments, jamming events and/or their consequences are detected and/or tracked. A device can, and sometimes does, track those devices that it is in communication with by using the traffic channel.

The techniques of various embodiments may be implemented using software, hardware and/or a combination of software and hardware. In some embodiments, modules are implemented as physical modules. In some such embodiments, the individual physical modules are implemented in hardware, e.g., as circuits, or include hardware, e.g., circuits, with some software. In other embodiments, the modules are implemented as software modules which are stored in memory and executed by a processor, e.g., general purpose computer. Various embodiments are directed to apparatus, e.g., stationary wireless nodes, mobile nodes such as mobile access terminals of which cell phones are but one example, access point such as base stations including one or more attachment points, servers, and/or communications systems. Various embodiments are also directed to methods, e.g., method of controlling and/or operating wireless communications devices including mobile and/or stationary nodes, access points such as base stations, server nodes and/or communications systems, e.g., hosts. Various embodiments are also directed to machine, e.g., computer, non-transitory readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, receiving first and second signals from second and third communications devices, respectively, on a first shared communications resource being used by both said second and third communications devices; determining that signal quality of the first and second signals is insufficient for reliable decoding; and transmitting an interference signal on said first shared communications resource.

Thus, in some embodiments various features are implemented using modules. Such modules may be implemented using software, hardware or a combination of software and hardware. Many of the above described methods or method steps can be implemented using machine executable instructions, such as software, included in a non-transitory machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a non-transitory computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as wireless terminals are configured to perform the steps of the methods described as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While various features are described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), GSM and/or various other types of communications techniques which may be used to provide wireless communications links, e.g., WAN wireless communications links, between access points and wireless communications device such as mobile nodes and wireless communications. The methods and apparatus may be, and in various embodiments are, used with CDMA, orthogonal frequency division multiplexing (OFDM), GSM and/or various other types of communications techniques which may be used to provide wireless communications links, e.g., direct peer to peer wireless communications links, between wireless communications devices including peer to peer interfaces. In some embodiments a wireless communications device including both a wide area network interface and a peer to peer network interface uses different communications techniques for the different interfaces, e.g., one of CDMA and GSM based techniques for the WAN interface and OFDM based techniques for the peer to peer interface. In some embodiments the access points are implemented as base stations which establish communications links with mobile nodes using CDMA, GSM and/or OFDM. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first communications device, the method comprising:
   receiving first and second signals from second and third communications devices, respectively, on a first shared communications resource being used by both said second and third communications devices;
   determining that signal quality of the first and second signals is insufficient for reliable decoding;
   estimating a received power level of the stronger one of the first and second signals;
   determining if the estimated received power level exceeds a threshold power level; and
   transmitting an interference signal, after it is determined that that the signal quality of the first and second signals is insufficient for reliable decoding and the estimated received power level exceeds the threshold power level, on said first shared communications resource, transmission of the interference signal following said determining and being contingent on said determining that the signal quality of the first and second signals is insufficient for reliable decoding.

2. The method of claim 1, wherein transmitting the interference signal includes transmitting said interference signal at a power level sufficient to be detected as a signal collision by at least one of said second and third devices.

3. The method of claim 1, further comprising:
   receiving third and fourth signals from fourth and fifth communications devices, respectively, on a second shared communications resource being used by both said fourth and fifth communications devices;
   estimating a second received power level of the stronger one of the third and fourth signals;
   determining that signal quality of the third and fourth signals is insufficient for reliable decoding;
   comparing the second estimated received power level to said threshold power level to determine if the second estimated received power level exceeds said threshold power level; and
   upon determining that said second estimated received power level does not exceed said threshold power level deciding not to transmit a second interference signal on said second shared communications resource.

4. The method of claim 1, further comprising:
   determining said threshold power level based on power received on at least one other shared communications resource.

5. The method of claim 1, wherein said first shared communications resource includes OFDM tone-symbols corresponding to multiple symbol time periods.

6. The method of claim 5, wherein said first shared communications resource is a peer discovery device communications channel including said OFDM tone-symbols.

7. A first communications device comprising:
   means for receiving first and second signals from second and third communications devices, respectively, on a first shared communications resource being used by both said second and third communications devices;
   means for determining that signal quality of the first and second signals is insufficient for reliable decoding;
   means for estimating a received power level of the stronger one of the first and second signals;
   means for determining if the estimated received power level exceeds a threshold power level; and
   means for transmitting an interference signal, after it is determined that that the signal quality of the first and second signals is insufficient for reliable decoding and the estimated received power level exceeds the threshold power level, on said first shared communications resource, said interference signal being transmitted by said means for transmitting following said determining and being contingent on said determining that the signal quality of the first and second signals is insufficient for reliable decoding.

8. The first communications device of claim 7, wherein said means for transmitting an interference signal includes means for transmitting said interference signal at a power level sufficient to be detected as a signal collision by at least one of said second and third devices.

9. The first communications device of claim 7, further comprising:
   means for receiving third and fourth signals from fourth and fifth communications devices, respectively, on a second shared communications resource being used by both said fourth and fifth communications devices;
   means for estimating a second received power level of the stronger one of the third and fourth signals;
   means for determining that signal quality of the third and fourth signals is insufficient for reliable decoding;
   means for comparing the second estimated received power level to said threshold power level to determine if the second estimated received power level exceeds said threshold power level; and
   means for deciding not to transmit a second interference signal on said second shared communications resource, upon said means for comparing determining that said second estimated received power level does not exceed said threshold power level.

10. The first communications device of claim 7, further comprising:
    means for determining said threshold power level based on power received on at least one other shared communications resource.

11. The first communications device of claim 7, wherein said first shared communications resource includes OFDM tone-symbols corresponding to multiple symbol time periods.

12. The first communications device of claim 11, wherein said first shared communications resource is a peer discovery device communications channel including said OFDM tone-symbols.

13. A computer program product for use in a first communications device, the computer program product comprising:
    a non-transitory computer readable medium comprising:
      code for causing at least one computer to receive first and second signals from second and third communications devices, respectively, on a first shared communications resource being used by both said second and third communications devices;
      code for causing said at least one computer to determine that signal quality of the first and second signals is insufficient for reliable decoding;
      code for causing said at least one computer to estimate a received power level of the stronger one of the first and second signals;

code for causing said at least one computer to determine if the estimated received power level exceeds a threshold power level; and code for causing said at least one computer to transmit an interference signal, after it is determined that that the signal quality of the first and second signals is insufficient for reliable decoding and the estimated received power level exceeds the threshold power level, on said first shared communications resource, transmission of the interference signal following said determining and being contingent on said determining that the signal quality of the first and second signals is insufficient for reliable decoding.

14. A first communications device comprising:

at least one processor configured to:
  receive first and second signals from second and third communications devices, respectively, on a first shared communications resource being used by both said second and third communications devices;
  determine that signal quality of the first and second signals is insufficient for reliable decoding;
  estimate a received power level of the stronger one of the first and second signals;
  determine if the estimated received power level exceeds a threshold power level; and
  transmit an interference signal on said first shared communications resource, said processor being configured to transmit the interference signal following said determining that the signal quality of the first and second signals is insufficient for reliable decoding and that the estimated received power level exceeds the threshold power level; and
memory coupled to said at least one processor.

15. The first communications device of claim 14, wherein said at least one processor is further configured to:
  transmit said interference signal at a power level sufficient to be detected as a signal collision by at least one of said second and third devices, as part of being configured to transmit the interference signal.

16. The first communications device of claim 14, wherein said at least one processor is further configured to:
  receive third and fourth signals from fourth and fifth communications devices, respectively, on a second shared communications resource being used by both said fourth and fifth communications devices;
  estimate a second received power level of the stronger one of the third and fourth signals;
  determine that signal quality of the third and fourth signals is insufficient for reliable decoding;
  compare the second estimated received power level to said threshold power level to determine if the second estimated received power level exceeds said threshold power level; and
  decide not to transmit a second interference signal on said second shared communications resource, upon determining that said second estimated received power level does not exceed said threshold power level.

17. The first communications device of claim 14, wherein said at least one processor is further configured to:
  determine said threshold power level based on power received on at least one other shared communications resource.

* * * * *